United States Patent
Jordan

(10) Patent No.: US 11,995,671 B1
(45) Date of Patent: May 28, 2024

(54) PREDICTIVE ANALYTICAL MODEL FOR COMMERCIAL REAL ESTATE LEASE RENT RATES

(71) Applicant: GEOSPATIAL ANALYTICS, INC., Phoenix, AZ (US)

(72) Inventor: Brian C. Jordan, Phoenix, AZ (US)

(73) Assignee: GEOSPATIAL ANALYTICS, INC., Phoenix, AZ (US)

( * ) Notice: Subject to any disclaimer, the term of this patent is extended or adjusted under 35 U.S.C. 154(b) by 64 days.

(21) Appl. No.: 17/574,028

(22) Filed: Jan. 12, 2022

Related U.S. Application Data

(60) Provisional application No. 63/296,216, filed on Jan. 4, 2022, provisional application No. 63/136,792, filed on Jan. 13, 2021.

(51) Int. Cl.
 *G06Q 30/0201* (2023.01)
 *G06Q 30/06* (2023.01)
 *G06Q 50/16* (2012.01)

(52) U.S. Cl.
 CPC ......... *G06Q 30/0206* (2013.01); *G06Q 30/06* (2013.01); *G06Q 50/16* (2013.01)

(58) Field of Classification Search
 CPC ..... G06Q 30/0206; G06Q 30/06; G06Q 50/16
 See application file for complete search history.

(56) References Cited

U.S. PATENT DOCUMENTS

| | | | | |
|---|---|---|---|---|
| 10,445,843 | B1* | 10/2019 | Catalano | G06Q 30/0625 |
| 2014/0257924 | A1* | 9/2014 | Xie | G06Q 30/0202 |
| | | | | 705/7.31 |
| 2014/0365339 | A1* | 12/2014 | Hessen | G06Q 30/0629 |
| | | | | 705/26.64 |
| 2015/0332179 | A1* | 11/2015 | Vergano | G06Q 10/063 |
| | | | | 705/7.11 |
| 2019/0180393 | A1* | 6/2019 | Kelly | G06Q 40/03 |
| 2020/0211131 | A1* | 7/2020 | Pangerl | G06Q 50/16 |
| 2022/0222758 | A1* | 7/2022 | Beckman | G06Q 50/16 |

OTHER PUBLICATIONS

J. Yang and D. J. Lilja, "Reducing Relational Database Performance Bottlenecks Using 3D XPoint Storage Technology," 2018 17th IEEE International Conference on Trust, Security and Privacy in Computing and Communications (Year: 2018).*

* cited by examiner

*Primary Examiner* — Resha Desai
*Assistant Examiner* — Carter P Brockman
(74) *Attorney, Agent, or Firm* — Snell & Wilmer L.L.P.

(57) ABSTRACT

Systems and methods for forecasting commercial real estate lease rent rates are disclosed. Exemplary embodiments receive a series of independent variables that represent attributes of a specific commercial real estate property, scale and normalize the series of independent variables, and assemble the scaled and normalized series of independent variables. Weightings may be applied to the assembled scaled and normalized series of independent variables to predict a rental rate for the specific commercial real estate property.

9 Claims, 29 Drawing Sheets

PREDICTIVE ANALYTICAL MODEL FOR COMMERCIAL REAL ESTATE LEASE RENT RATES

CROSS-REFERENCE TO RELATED APPLICATIONS

This application claims priority to, and the benefit of, U.S. Provisional Patent Application No. 63/136,792 filed on Jan. 13, 2021 and entitled "Predictive Analytical Model for Commercial Real Estate Lease Rent Rates." This application also claims priority to, and the benefit of, U.S. Provisional Patent Application No. 63/296,216 filed on Jan. 4, 2022 and entitled "Predictive Analytical Model for Financial Transactions." The disclosure of each of the foregoing applications is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to real estate, and in particular to systems and methods for calculating commercial real estate lease rates.

BACKGROUND

Estimating valuations for residential properties has been accomplished by the use of appraisals. These appraisals are required for trillions of dollars of lending from financial institutions as it is a scientific approach to predict what the value of a residential property. The scientific approach that is used is determining the cause (those being the independent variables) of what is attempting to be measured or predicted (that being the dependent variable). Residential appraisals use data from the sales of other similar properties to compare the physical attributes of each property, and through comparative analytics arrive at an approximate valuation. There is a single set of independent variables, which are the physical attributes being assessed such as condition, age, size and features, to determine the dependent variable, that being the predicted value of the property. These independent variables remain constant regardless of the property being valued, and the analytic process, being the statistical methods, to use these variables to determine the dependent variable remains constant as well. This approach makes the predicted valuations of residentials highly scalable and highly accurate, which is critical for the financial institutions in making lending decisions. In essence, this business method forms the financial foundation for the entire residential lending industry.

Management of commercial real estate portfolios may include attempts to accurately evaluate real estate asset values and rental rates. Real estate asset rental rates may be particularly important for determining the investment performance of commercial real estate portfolios, for owners (landlords), occupiers (tenants) and lenders. Accurately evaluating commercial real estate rental rates, that generate trillions of dollars annually, is much more challenging then predicting residential valuations for many reasons. First, unlike residential properties which are all used for a single purpose of housing people, commercial properties are used for hundreds of uses, such as manufacturing, warehousing, retail, offices, and healthcare. Therefore, within each given category, of use, there is a different set of independent variables that may be used to determine the independent variable, that being the predicted rent rate. As such, instead of having a few dozen independent variables that are used for residential valuations, in the commercial sector there are hundreds of independent variables. Within a given use, there is significant segmentation. For instance, in retail, there are hundreds of different types of stores, including clothing stores, grocery, stores, shoe stores, phones stores furniture stores. Each segment of a specific use then has its own set of independent variables. This multiplies the number of independent variables into the thousands. Finally, each owner, and each corresponding occupier of a given property for a given use has their unique business strategy which varies from all of the other strategies of owners and occupiers of properties for the same use. The unique nature of each discrete real estate property, along with the unique nature of any given business that occupies the property compounds the complexity of forecasting rental rates for any given property astronomically and is not scalable. The cost to manually account for all of the unique independent variables and apply a scientific method to each specific scenario is cost prohibitive. Therefore, owners, occupiers and lenders, while using data to help directionally determine an accurate predicted rent rate, cannot fully leverage a scientific method to gain a higher confidence in the accuracy of the prediction, or outcome. They instead must rely on intuition, opinions, and other subjective evidence. Accordingly, developing a scalable predictive analytical model for commercial real estate lease rates to scientifically measure and predict one or more of the other aspects of such transactions discussed above may be advantageous.

SUMMARY

A method of forecasting commercial real estate lease rent rates (the dependent variable) includes receiving, at a computing system, a series of independent variables that represent attributes of a specific commercial real estate property, as well as other independent variables such as attributes of the lease, landlord, and negotiation strategy, that may have a correlation with the value of the dependent variable. The method includes configuring the system to the unique set of variables that are relevant to any given set of circumstances. The method includes scaling and normalizing the series of independent variables. Additionally, the method includes assembling the scaled and normalized series of independent variables. The method also includes applying weightings to the assembled scaled and normalized series of independent variables and predicting a rental rate for the specific commercial real estate property.

A system for forecasting commercial real estate lease rent rates includes at least one processor and a tangible, non-transitory memory coupled to the at least one processor. The memory includes instructions causing the at least one processor to receive, at the device, a series of independent variables that represent attributes of a specific commercial real estate property. The memory also includes instructions causing the at least one processor to scale and normalize the series of independent variables. Additionally, the memory includes instructions causing the at least one processor to assemble the scaled and normalized series of independent variables. The memory also includes instructions causing the at least one processor to apply weightings to the assembled scaled and normalized series of independent variables and predict a rental rate for the specific commercial real estate property.

An apparatus for forecasting commercial real estate lease rent rates is disclosed. The apparatus is configured to receive, at a computing system, a series of independent variables that represent attributes of a specific commercial real estate property. Additionally, the apparatus is configured to scale and normalize the series of independent variables. The apparatus is also configured to assemble the scaled and normalized series of independent variables. Additionally, the apparatus is configured to apply weightings to the assembled scaled and normalized series of independent variables and predict a rental rate for the specific commercial real estate property.

The contents of this section are intended as a simplified introduction to the disclosure, and are not intended to limit the scope of any claim.

BRIEF DESCRIPTION OF THE DRAWINGS

With reference to the following description and accompanying drawings, in various exemplary embodiments:

FIG. 3 illustrates another exemplary model of an analytic calculator input and output screen in accordance with an exemplary embodiment;

FIG. 8B illustrates an exemplary location module for an analytic calculator, in accordance with an exemplary embodiment;

DETAILED DESCRIPTION

Figure 1:
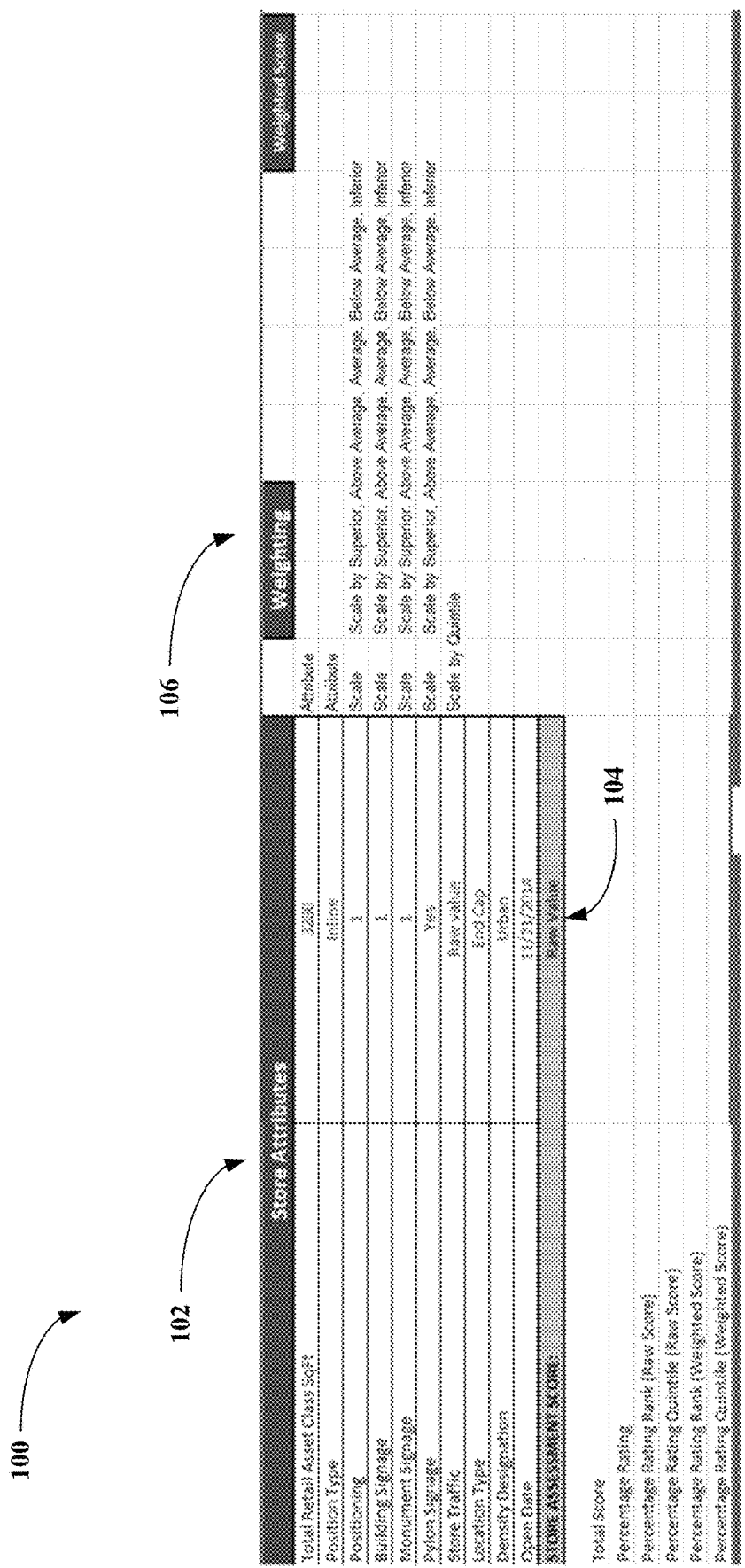
FIG. 1 illustrates an exemplary model of an analytic calculator input and output screen in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, the connecting lines shown in various figures contained herein are intended to represent exemplary functional relationships and/or physical couplings between various elements. It should be noted that many alternative or additional functional relationships or physical connections may be present in practical system and/or methods of use, for example predictive analytical models for commercial real estate lease rent rates.

A predictive analytical model for commercial real estate lease rent rates, sometimes referred to as a lease rent predictor, may allow a user to accurately forecast the outcome with respect to the lease rental rate of a negotiation between the lessor and lessee for a specific leasehold. The analysis may be expanded to forecast outcomes for sub-portfolios and entire portfolios of companies and entities with large leased commercial portfolios. The lease rent predictor may employ a process that uses data and statistics to determine the future outcome. Specifically, the lease rent predictor may use a combination of parametric models including, but not limited to, ordinary least squares, generalized linear models (GLM), logistic regression, random forests, decision trees, or multivariate adaptive regression splines.

In statistics, ordinary least squares method is a type of linear least squares method for estimating unknown parameters in a linear regression model. The ordinary least squares method selects parameters of a linear function of a set of explanatory variables by the principle of least squares, i.e., by minimizing the sum of the squares of the differences between the observed dependent variable in the given dataset and those predicted by the linear function.

In statistics, the generalized linear model is a flexible generalization of ordinary linear regression that allows for response variables that have error distribution models other than a normal distribution. The generalized linear model generalizes linear regression by allowing the linear model to be related to the response variable via a link function and by allowing the magnitude of the variance of each measurement to be a function of its predicted value.

In statistics, the logistic model is used to model the probability of a certain class or event existing, such as pass/fail, win/lose, alive/dead or healthy/sick. This can be extended to model several classes of events, such as determining whether an image contains a cat, dog, lion, etc. Each object being detected in the image would be assigned a probability between 0 and 1, with a sum of one. Logistic regression is a statistical model that, in its basic form, uses a logistic function to model a binary dependent variable, although many more complex extensions exist. In regression analysis, logistic regression is estimating the parameters of a logistic model.

Random forests or random decision forests are an ensemble learning method for classification, regression and other tasks that operate by constructing a multitude of decision trees at training time and outputting the class that is the mode of the classes (classification) or mean prediction (regression) of the individual trees. Random decision forests correct for decision trees' habit of overfitting to their training set.

A decision tree is a decision support tool that uses a tree-like model of decisions and their possible consequences, including chance event outcomes, resource costs, and utility. It is one way to display an algorithm that only contains conditional control statements. Decision trees are commonly used in operations research, specifically in decision analysis, to help identify a strategy most likely to reach a goal, but are also a popular tool in machine learning.

In statistics, multivariate adaptive regression splines method is a form of regression analysis introduced by Jerome H. Friedman in 1991. It is a non-parametric regression technique and can be seen as an extension of linear models that automatically models nonlinearities and interactions between variables.

With reference now to FIGS. 1-19, exemplary methods and systems are illustrated in connection with various exemplary embodiments. In particular, with reference to FIG. 1, illustrated is a diagram illustrating an example model of an analytic calculator input and output screen 100 in accordance with an exemplary embodiment. The screen 100 includes a number of store attributes 102 used to generate a store assessment score 104. For example, the store attributes 102 may include, but are not limited to, total retail asset class square feet, position type, positioning, building signage, monument signage, pylon signage, store traffic, location type and store condition. The store attributes 102 may be used to calculate commercial real estate lease rates or other commercial real estate lease valuations. The total retail asset class square feet may be the area of the particular real estate. The position type may be an indication of the type of space within a property, e.g., such as "inline" for a store front linearly located along a group of store fronts, within a strip mall, an "end cap" having a location situated on one end of a strip center with three exterior sides and only one side adjoining another store such that all three sides may then be visible by potential customers. The positioning may relate to where a property is located relative to other properties within a development or adjacent to the development. The building signage may include any sign or markings related to a subject property located on the building. The screen 100 further includes indications of weighting 106.

The monument signage may be signage at an entrance to a subject property or along a street adjacent to the subject property and located on a monument or otherwise near the ground. The pylon signage may be signage at an entrance to a subject property or along a street adjacent to the subject property and located on a pylon or otherwise above the ground. In general, any of the signage may be located, for example, on the subject property, within the development of the subject property, adjacent to the subject property, or otherwise located in such a way as to advertise the subject property or the development containing the subject property to people in the general vicinity of the property.

The store traffic may be a count of traffic through a subject store. For example, store traffic may be a number of people entering a subject store. In some examples, store traffic may count paying customers or people within age ranges that are likely to be potential paying customers.

The location type may be an indication of the kind of location of the subject property. For example, the location may be a retail location, a church location, office space, or other types of real estate locations.

The density designation may be an indication of the density of other retailers in the trade area containing the subject real estate, or of the human population, or other variables that influence store performance. For example, the density designation may indicate a density by totaling the square footage of other retail properties in the trade area or a density of population of people per square mile in a trade area where the property is located.

Figure 2A:
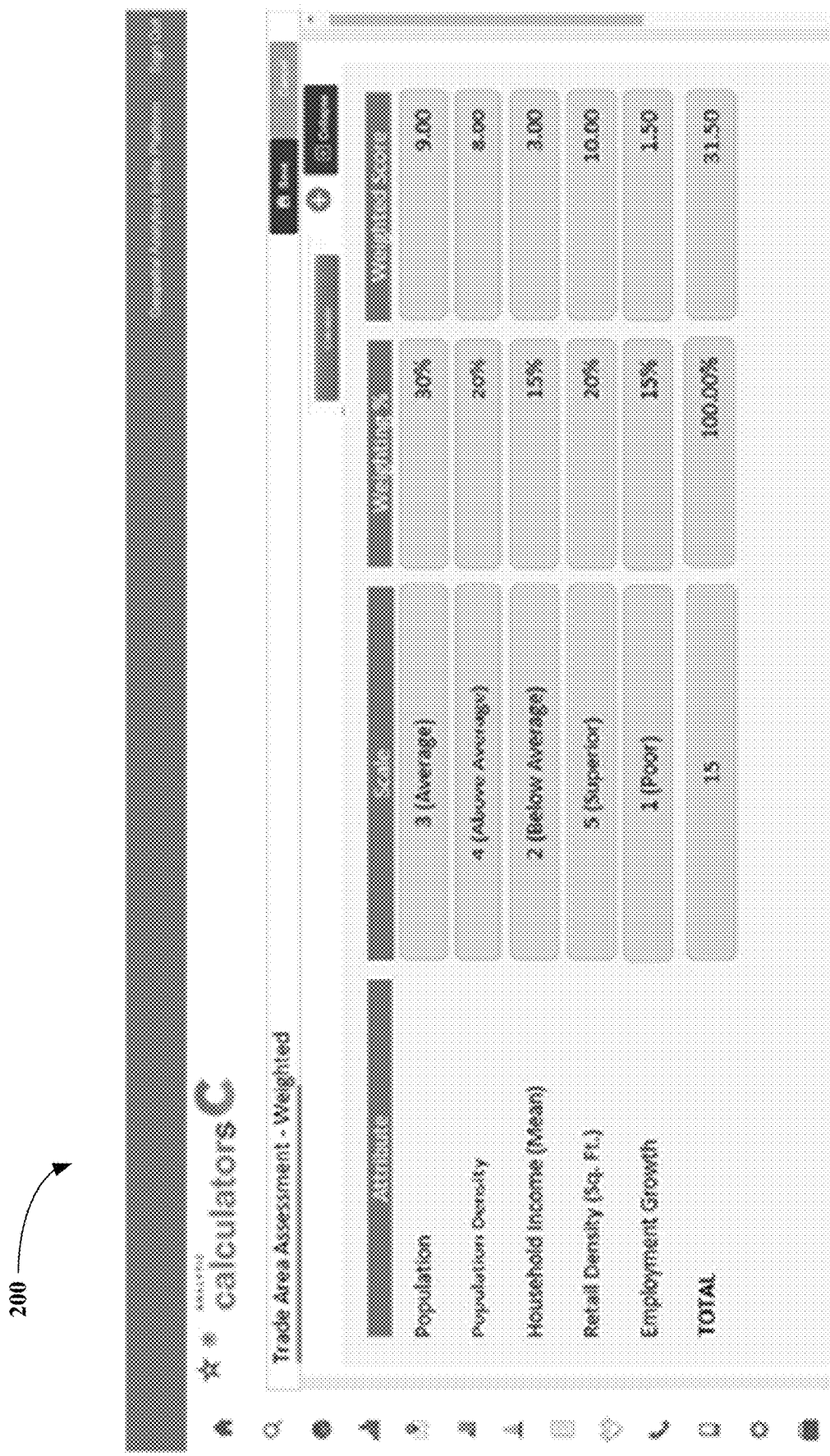
FIGS. 2A-2C illustrate exemplary structures of an analytic calculator.
Figure 2B:
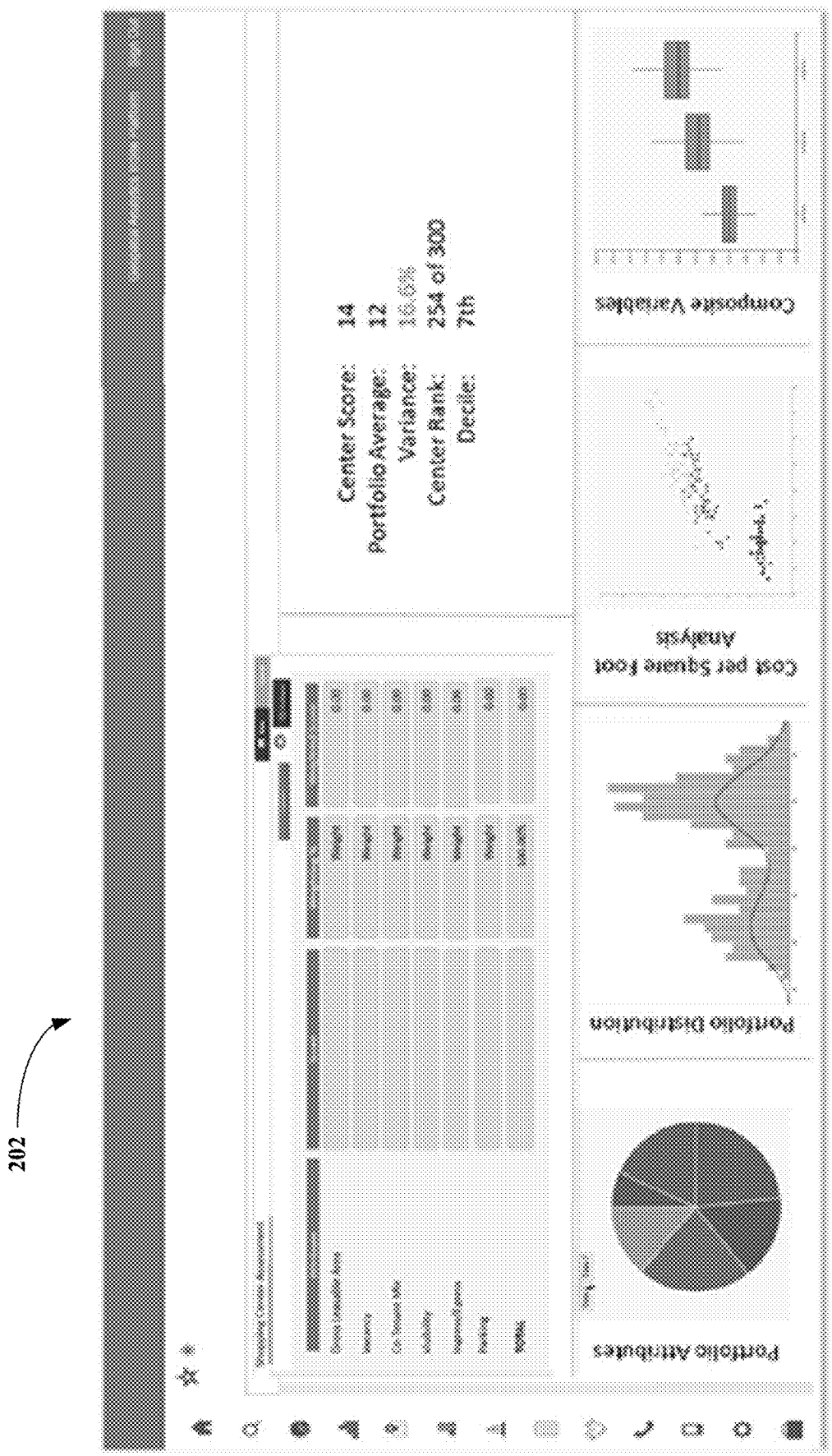
Figure 2C:
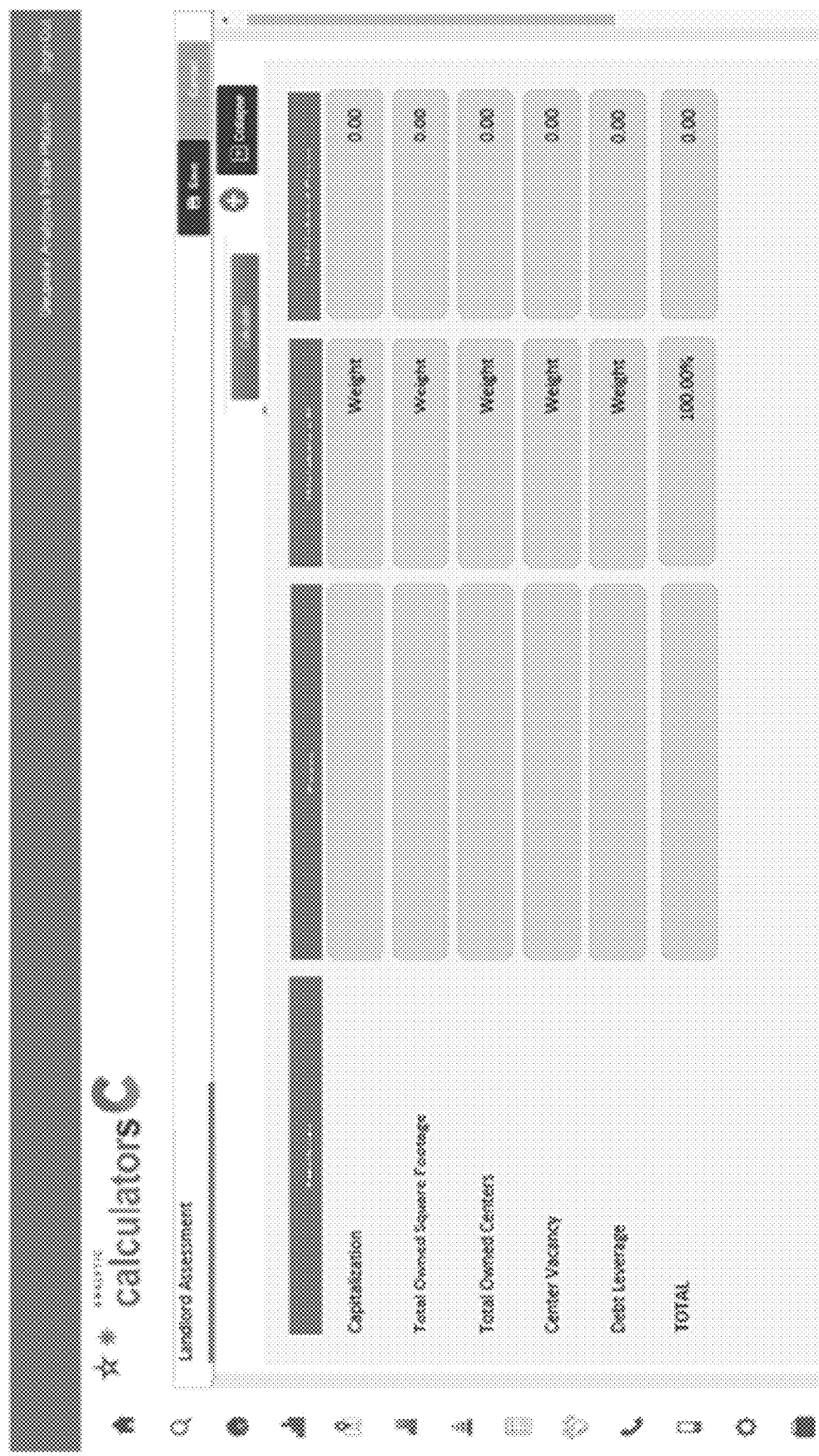

FIGS. 2A-2C illustrate exemplary structures of an analytic calculator in accordance with various embodiments. This is an example of a system production view, as opposed to, for example, a spreadsheet prototype. The example shows an application of scaling 200 as well as weighting (FIG. 2A), FIG. 2B shows a version of a Shopping Center Assessment Calculator 202 with comparative rankings as well as statistical analysis. FIG. 2C shows a version of a Landlord Assessment Calculator 204.

In an example, a piece of a solution are the configuration capabilities provided in the administrative tool, the configuration manager. Situations vary, so using the same variables will not always provide the most accurate outcome. Therefore, users may need to be able to add and modify the variables used in the calculators in some examples. The users may also need to store the data in the modules for future analysis. The statistical methods used may vary as well. The configuration calculator may allow the user to configure the variables in the calculators, as well as the statistical methods and algorithms that are used. The configuration calculator may also configure the modules to store and bind the data elements.

In various exemplary embodiments, a lease rent predictor may use one or more of the following independent variables that may be contained within specific modules in the system to represent attributes of a specific entity (record) being housed within the system.
1. Market
2. Trade Area
3. Center (Shopping Center, Business Park, etc.)
4. Asset (Building Enclosure/Store/Warehouse, Office, etc.)

5. Lease (Contract)
6. Landlord
7. Comparable Assets (Real Estate)
8. Negotiator
9. Strategy The independent variables may be composite variables that are made up of multiple variables. A composite variable is a variable created by combining two or more individual variables, called indicators, into a single variable. Composite variables are used to measure multidimensional concepts that are not easily observed. To create composite variables, the system may specify indicators, then determine a method for computing a single score from those indicators. The indicator variables might be summed, averaged, transformed, and/or weighted. This involves aggregating data, scaling and normalizing the data. The advantages of using composite variables are that they are usually more robust and usually have a broader range of scores than uni-dimensional variables. A disadvantage in using composite scores often has to do with validity—how accurately the final score reflects the intended concept.

In an embodiment, these 10 independent variables may be preconfigured within the system based upon the profile of the user and each have their own set of defined independent variables that are used to provide a value for the predictive calculator. These preconfigured defined variables can be changed by the administrative tool using a library of templates that have different types and combinations of variables. These preconfigured weightings and the weightings within the library templates have been created using statistical modeling based upon a sample population similar to those populations normally contained within the portfolio of profiles of users that are similar in nature.

To arrive at an outcome, the lease rent predictor may use scaling and normalization calculators. The scaled and normalized values are used by the lease rate predictor by comparing the values of the independent variables to the values of completed transactions to predict the outcome of the current situation based upon predictive statistical models utilized by the system. Once the required data fields in a given module are populated, the raw data may be scaled, and the raw data may be weighted. The administrative capabilities of the system may allow a user to determine how the data is to be scaled by presetting ranges, tiers, thresholds or other scaling methods. The scaling and normalization calculators may then perform calculations in the system to scale the data.

The calculator may then apply weightings based upon the results of statistical analysis that is performed on the data relative to the given variables as defined by the specific situation being analyzed. The weightings are preset within the system based upon the user's profile. A library of templates containing different weightings can be accessed through the administrative tools. These preconfigured weightings and the weightings within the library templates have been created using statistical modeling based upon a sample population similar to those populations normally contained within the portfolio of profiles of users that are similar in nature. If the user has past data available, or as those data sets are developed over time, then the weightings are adjusted to be based upon the unique aspects of a user's situation and past transactions to determine the relative importance of any given independent variable vis-a-vis the other variables. The administrative tool can create new weightings or modify existing weightings to address the given set of factors within the situation. In doing so, the administrative capabilities ensure that the selection of variables and associated value are done so in a scientific manner that won't compromise the accuracy of the outcome.

In addition to using scaling and normalization calculators, other calculators may be used within the process. For example, to arrive at a desired scaling for the independent variable of comparable market rents, a comparable market rent calculator may be used to make rent rate adjustments to other similar leaseholds to determine the equivalent market rent for a subject property.

Figure 13:
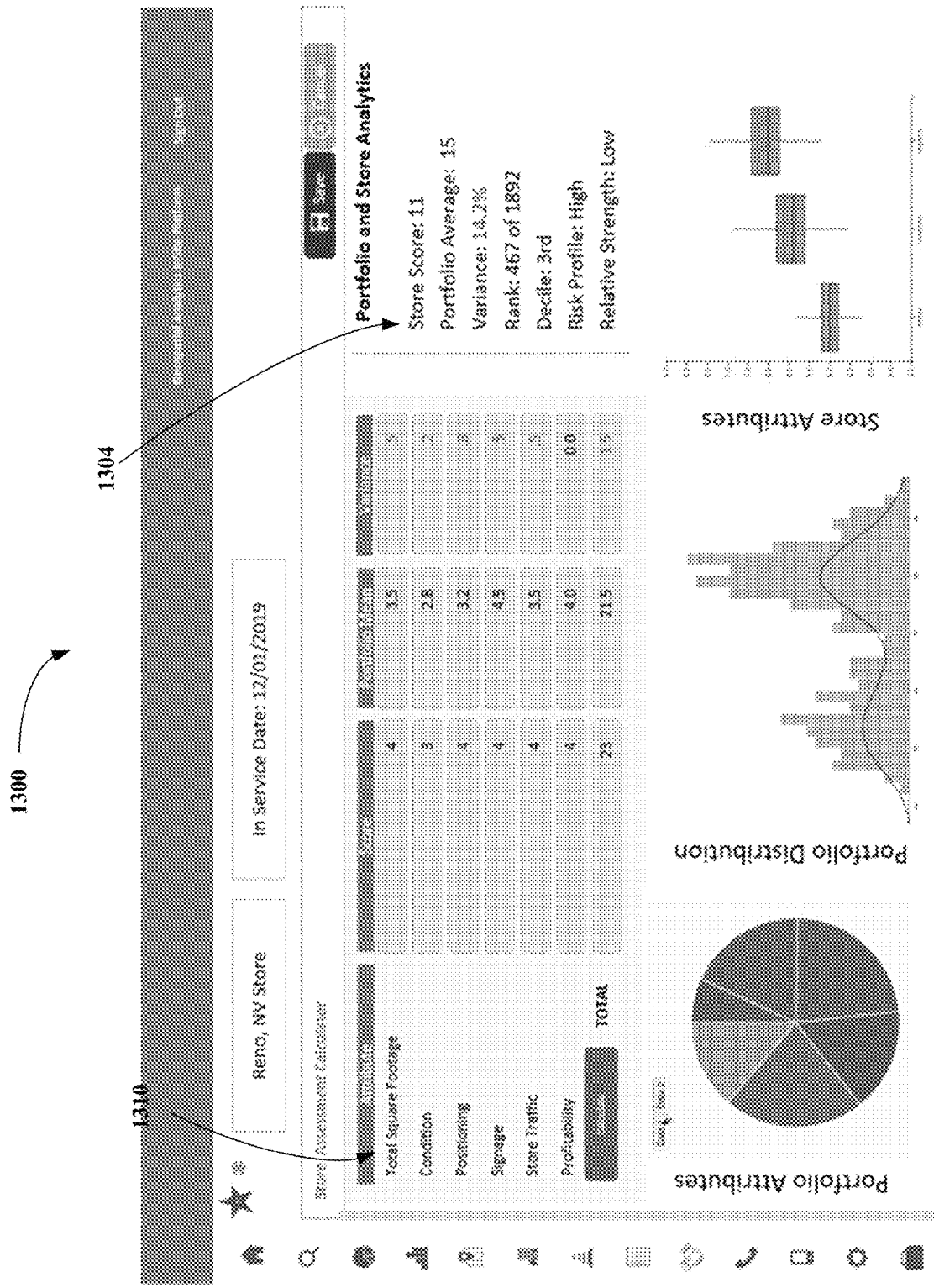
FIG. 13 illustrates a diagram illustrating an example model of a store assessment calculator input and output screen in accordance with an exemplary embodiment.

With reference now to FIG. 13, in various exemplary embodiments relating to Asset (e.g., retail store) as an independent variable: FIG. 13 is a diagram illustrating an example model of an analytic calculator input and output screen 1300 in accordance with an exemplary embodiment. The screen 1300 includes a number of store attributes 1310 used to generate a store assessment score 1304. For example, one of the composite variables, the asset (e.g., retail store), can have multiple independent variables such as positioning, size, and signage, which are all used to calculate the composite score of the asset which is one of the independent variables which will be used to perform predictive analytics which will provide the anticipated rent rate. The composite score of the asset may then be used as an independent variable by the lease rent predictor to determine the dependent variable, which may be the predicted lease rate.

For example, the retail store attributes 1310 may include, but are not limited to, total retail asset class square feet, position type, positioning, building signage, monument signage, pylon signage, store traffic, location type and store condition. The store attributes 1310 may be used to calculate commercial real estate lease rates or other commercial real estate lease valuations. The total retail asset class square feet may be the area of the particular real estate. The position type may be an indication of the type of space within a property, e.g., such as "inline" for a store front linearly located along a group of store fronts, within a strip mall. The positioning may relate to where a property is located relative to other properties within a development or adjacent to the development. The building signage may include any sign or markings related to subject property located on the building. The screen 1300 may further includes indications of weighting.

The monument signage may be signage at an entrance to a subject property or along a street adjacent to the subject property and located on a monument or otherwise near the ground. The pylon signage may be signage at an entrance to a subject property or along a street adjacent to the subject property and located on a pylon or otherwise above the ground. In general, any of the signage may be located, for example, on the subject property, within the development of the subject property, adjacent to the subject property, or otherwise located in such a way as to advertise the subject property or the development containing the subject property to people in the general vicinity of the property.

The store traffic may be a count of traffic through a subject store. For example, store traffic may be a number of people entering a subject store. In some examples, store traffic may count paying customers or people within age ranges that are likely to be potential paying customers.

The location type may be an indication of the kind of location of the subject property. For example, the location may be a retail location, a warehouse location, office space, or other types of real estate locations.

Figure 14:
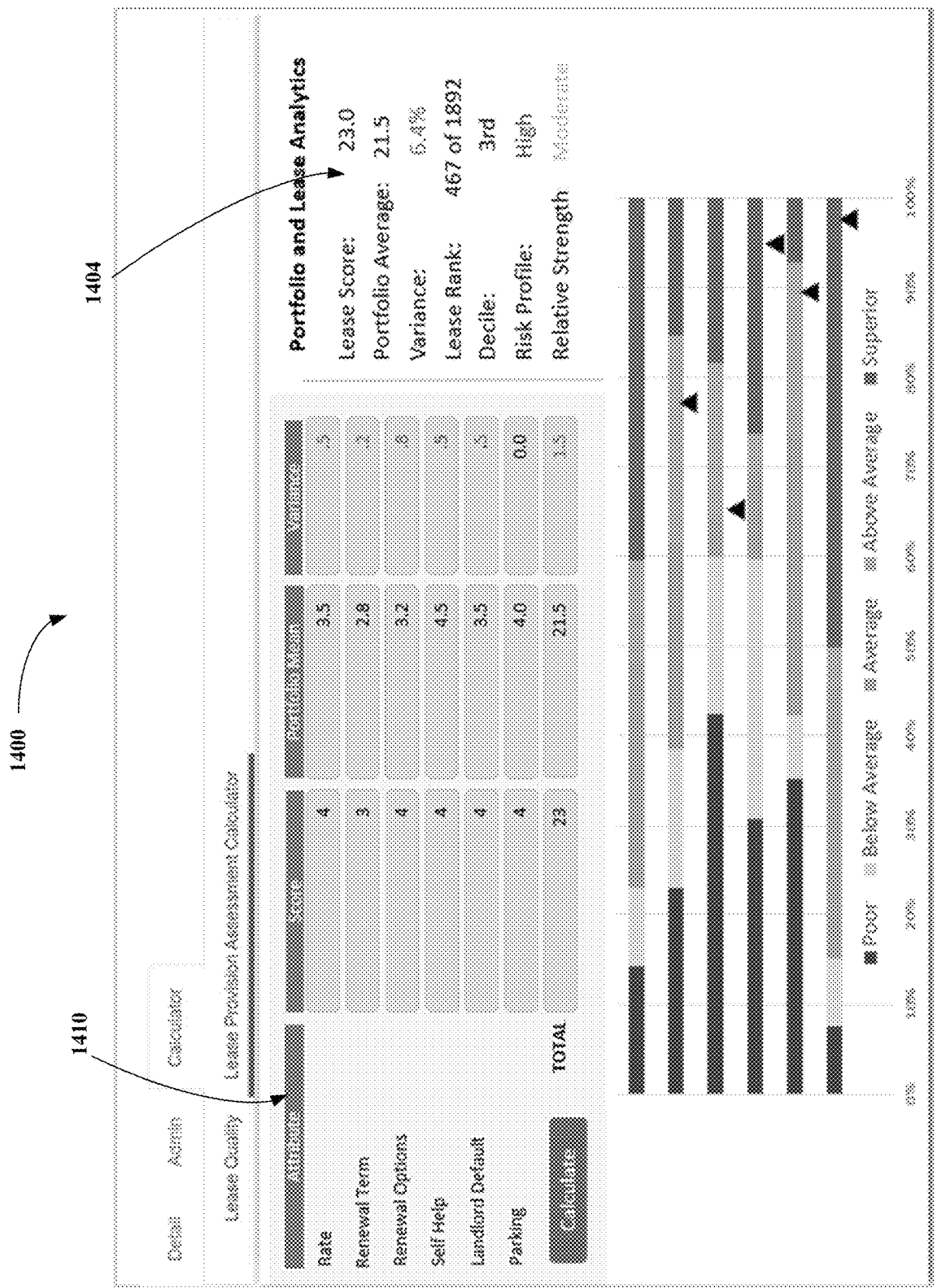
FIG. 14 is a diagram illustrating an example model of a lease provision calculator input and output screen in accordance with an exemplary embodiment.

Turning now to FIG. 14, in various exemplary embodiments relating to Lease as an independent variable: FIG. 14 is a diagram illustrating an example model of an analytic calculator input and output screen 1400 in accordance with an exemplary embodiment. The screen 1400 includes a number of Lease attributes 1410 used to generate a Lease assessment score 1404. For example, one of the composite variables, the Lease, can have multiple independent variables such as rate, renewal options, self-help and parking, which are all used to calculate the composite score of the Lease which is one of the independent variables which will be used to perform predictive analytics which will provide the anticipated rent rate. The composite score of the Lease may then be used as an independent variable by the lease rent predictor to determine the dependent variable, which may be the predicted lease rate.

For instance, the Rate would present the relative rating of the cost to lease the premises, in terms of square footage, as compared to other rates that comprise the Population of All Leases for the subject portfolio of commercial properties being evaluated. Renewal Options indicate the number of options that the Tenant has for renewing the lease, including the term (length) of each option as well as the prescribed rate. A favorable renewal rate, as compared to the Composite Variable of Comparable Rates, would have a very strong positive correlation to the predicted renewal rate. A high score on Self Help can have a correlation with a lower predicted rent rate, as the Tenant would have more control over the condition of their property, which is an independent Variable in the Composite Score of the Asset (e.g. Store). Parking would be an indicator of how much parking space for customers was allocated to the Tenant. A high score on the parking allocated to the Tenant would typically demonstrate a benefit to the Tenant, as customers would have easier access to the store. However, when compared to the total amount of available Parking in the Shopping Center itself, as an independent Variable in the Shopping Center Composite Score, parking might have a positive correlation to a higher rent rate prediction. The Landlord would be wanting to have a higher rent to justify the misappropriate amount of parking spaces allocated to the Tenant relative to other Tenants in the Shopping Center.

Figure 15:
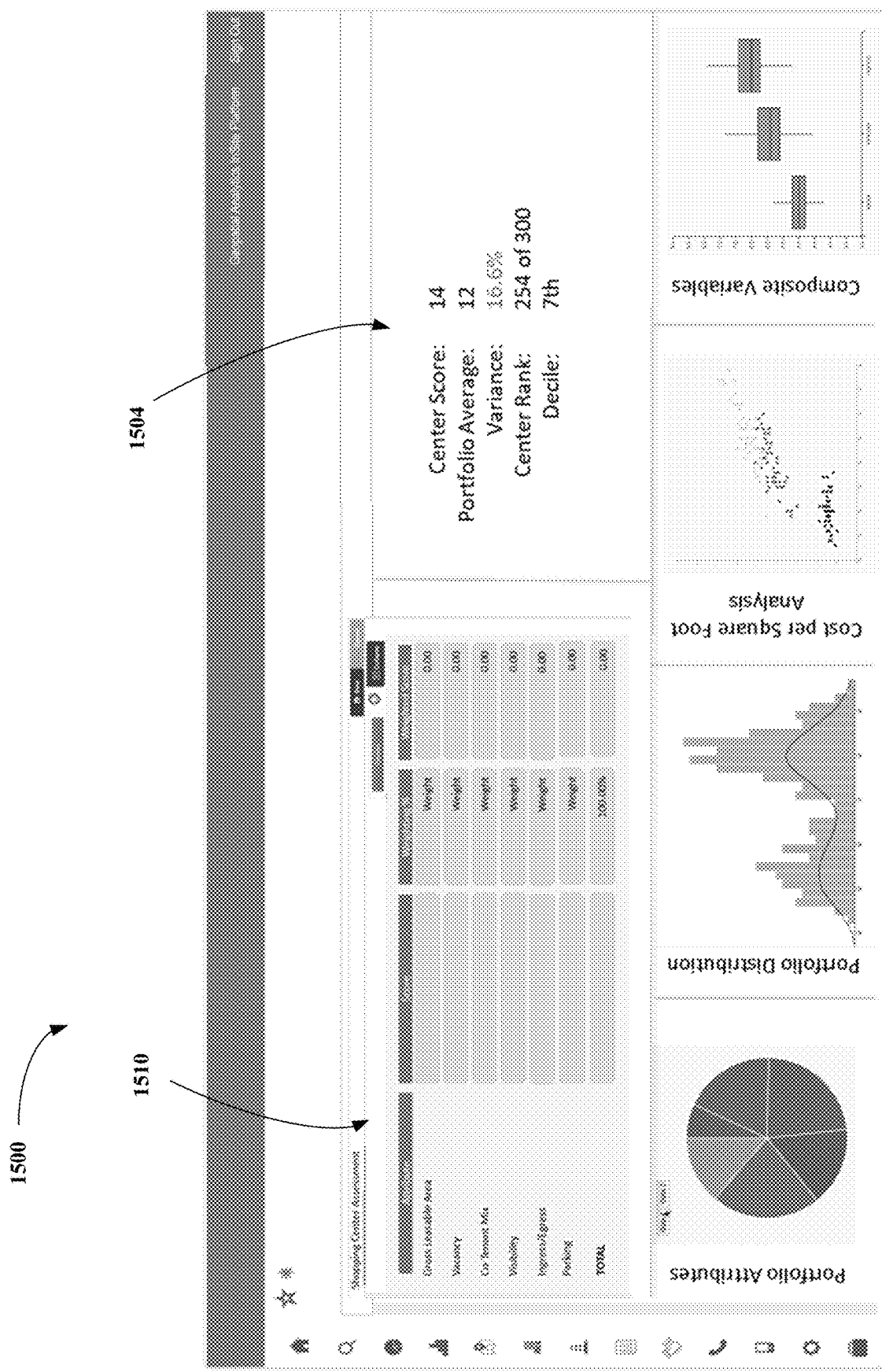
FIG. 15 is a diagram illustrating an example model of a shopping center calculator input and output screen in accordance with an exemplary embodiment.

Turning now to FIG. 15, in various exemplary embodiments relating to Shopping Center as an independent variable: FIG. 15 is a diagram illustrating an example model of an analytic calculator input and output screen 1500 in accordance with an exemplary embodiment. The screen 1500 includes a number of Shopping Center attributes 1510 used to generate a Shopping Center assessment score 1504, For example, one of the composite variables, the Shopping Center, can have multiple independent variables such as vacancy, co-tenant mix, visibility, parking and ingress/egress, which are all used to calculate the composite score of the Shopping Center which is one of the independent variables which will be used to perform predictive analytics which will provide the anticipated rent rate. The composite score of the asset may then be used as an independent variable by the lease rent predictor to determine the dependent variable, which may be the predicted lease rate.

For instance, the Co-Tenant would present the relative rating of the mix of tenants in the subject shopping center, being favorable or unfavorable, as compared to other Shopping Centers that comprise the population of all Shopping Centers for the subject portfolio of commercial properties being evaluated. Shopping Center Vacancy is the amount of vacancy, that being amount of square footage that is currently not leased, withing the subject Shopping Center as compared to the total population of Shopping Centers being assessed. A high vacancy rate can have a correlation with a lower predicted rent rate, as a high vacancy rate can be an indicator that the Shopping Center was not as desirable for tenants as other locations, Ingress/Egress to the Shopping Center, as well as Parking are indicators of ease of accessibility for customers, and can have a correlation to the overall performance and desirability of a Shopping Center, which can also serve as Independent Variables to the predicted lease rate, and are included in the composite scoring of the Shopping Center.

If the user has past data available, or as those data sets are developed over time, then the variables are adjusted to be based upon the unique aspects of a user's situation and past transactions to determine the relative importance of any given independent variable vis-a-vis the other variables. Furthermore, the administrative tool can create new variables or modify existing variables to address the given set of factors within the situation. In doing so, the administrative capabilities ensure that the selection of variables and associated value are done so in a scientific manner that won't compromise the accuracy of the outcome.

For instance, the composite variable Center can come preconfigured with the variables of physical condition, parking ratio and ingress/egress to parking lot. However, Retailer "A" has a distribution strategy that locates the retail store in dense urban street front stores. As such, the variables of parking ratio and ingress/egress to parking lot are not applicable to Retailer "A". Foot traffic on the street in front of a location is a much more significant indicator of the quality of the location. Retailer "A" would then use the administrative tool to create "Foot Traffic" as a variable to be used in scoring the composite value for the Center. Ever changing business drivers, requirements and strategies require that this capability is present to maintain the accuracy of the outcome. Static models cannot provide all of the possible combinations that would be needed, nor anticipate the unique drivers and strategies of any given business.

Figure 16:
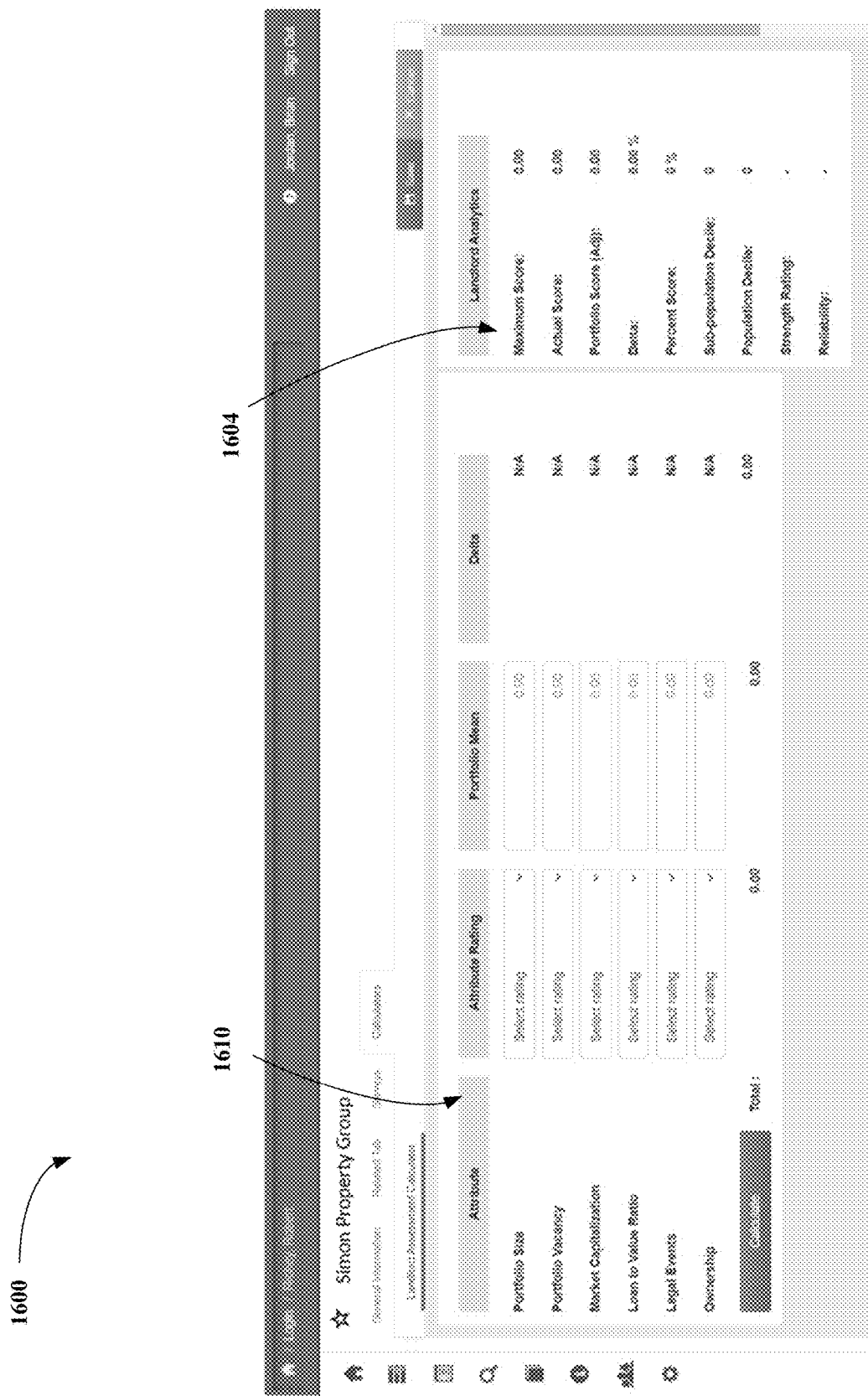
FIG. 16 is a diagram illustrating an example model of a landlord calculator input and output screen in accordance with an exemplary embodiment.

With reference now to FIG. 16, in various exemplary embodiments relating to Landlord as an independent variable: FIG. 16 is a diagram illustrating an example model of an analytic calculator input and output screen 1600 in accordance with an exemplary embodiment. The screen 1600 includes a number of Landlord attributes 1610 used to generate a Landlord assessment score 1604. For example, one of the composite variables, the Landlord, can have multiple independent variables such as size, vacancy and capitalization, which are all used to calculate the composite score of the Landlord which is one of the independent variables which will be used to perform predictive analytics which will provide the anticipated rent rate. The composite score of the asset may then be used as an independent variable by the lease rent predictor to determine the dependent variable, which may be the predicted lease rate.

For instance, the Portfolio Size presents the relative rating of the total size of the Landlord's Portfolio, in terms of square footage, as compared to other Landlords that comprise the Population of All Landlords for the subject portfolio of commercial properties being evaluated. Portfolio Vacancy is the amount of vacancy, that being amount of square footage that is currently not leased, withing the Landlord's total portfolio. A high vacancy rate can have a correlation with a lower predicted rent rate, as a high vacancy rate can be an indicator that the Landlord was at financial risk due to a lower cash flow than would be required to sustain the Landlord's business. The Landlord's Market Capitalization or Loan to Value Ratio on the Landlord's portfolio may counter balance the risk presented by a higher vacancy rate, due to the Landlords financial strength if they are well capitalized and/or have a low Laon to Value Ratio. Legal Events such as lawsuits, as well as Ownership structure can also serve as Independent Variables to the predicted lease rate, and are included in the composite scoring of the Landlord.

Figure 17:
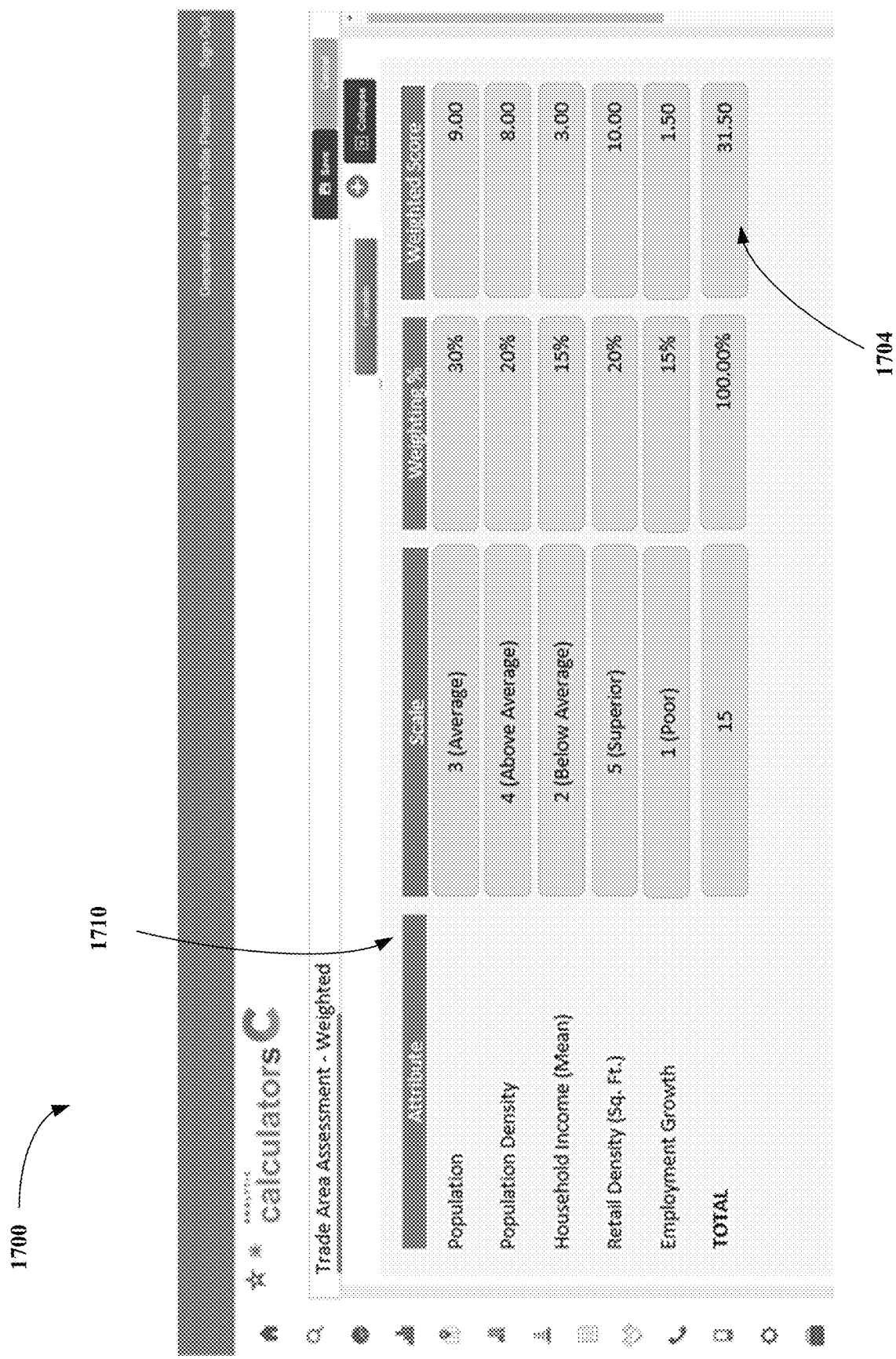
FIG. 17 is a diagram illustrating an example model of a trade are an analytic calculator input and output screen in accordance with an exemplary embodiment.

With reference now to FIG. 17, in various exemplary embodiments relating to Trade Area as an independent variable: FIG. 17 is a diagram illustrating an example model of an analytic calculator input and output screen 1700 in accordance with an exemplary embodiment. The screen 1700 includes a number of Trade Area attributes 1710 used to generate a Trade Area assessment score 1704. For example, one of the composite variables, the Trade Area, can have multiple independent variables such as population, population density, household income, retail density and employment growth, which are all used to calculate the composite score of the Trade Area which is one of the independent variables which will be used to perform predictive analytics which will provide the anticipated rent rate. The composite score of the Trade Area may then be used as an independent variable by the lease rent predictor to determine the dependent variable, which may be the predicted lease rate.

For instance, the Population presents the relative rating of the number of people that lived within a reasonable proximity of the subject store that can access and be considered potential customers for the subject store as compared to other mimetic values of the number of people that comprise the population of all Trade Areas for the subject portfolio of commercial properties being evaluated, Household Income indicates the mean average of household income for all homes in the Trade Area. A high-income value may be desirable for a retailer such as a jewelry store and can therefore be scored has a high value. However, if the analysis was being done by a discount consumer product score, a high value for mean household income may not be desirable, and therefore can be scored with a low value. Retail Density designates the total amount of retail square footage of all retailers that is within the trade area. A high density would be favorable for certain retailers that obtained benefit from other retailers being in the trade area and thus creating a draw for customers to shop in the area. Other retailers may view a high density as a negative as it can create too much competition for its specific line of products.

Figure 18:
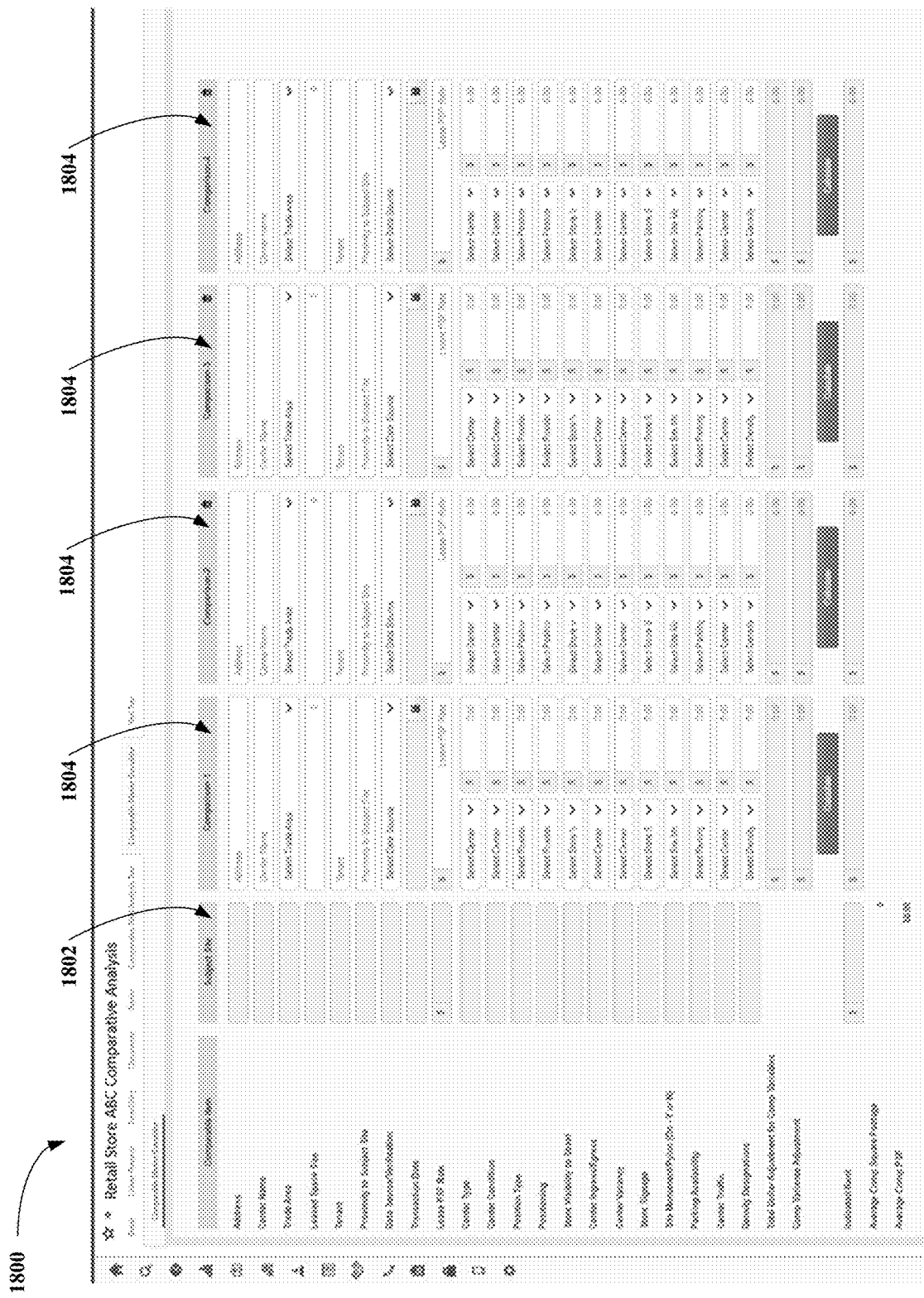
FIG. 18 is a diagram illustrating an example comparative analysis screen in accordance with an exemplary embodiment.

With reference now to FIG. 18, in various exemplary embodiments relating to Comparable Assets as an independent variable: FIG. 18 illustrates another exemplary model of an analytic calculator input and output screen 1800 in accordance with an exemplary embodiment. The illustrated calculator input and output screen 1800 includes data for a subject site 1802 and data for four (4) comparison sites 1804. The illustrated calculator input and output screen 1800 includes data such as address, tenant, proximity to subject site (for comparison sites 1804), data source, transaction date, lease price per square foot (PSF) rate, center name, center type, center condition, store signage information, position type, positioning, store visibility to street, center ingress/egress, center vacancy, leasing space size, site monument/pylon, parking available, center traffic, trade area, density designation, total dollar adjustment for various items, and adjustment. The illustrated calculator input and output screen 1800 also includes an indicated rent output, as well as averages, such as average comp PSF.

The address is the physical address of the property. The tenant may be the name of the tenant of the comparison property or a listing of "subject property" for the subject property. The proximity to subject site may be the distance from the subject property to the comparison site 1804, e.g., in feet, meters, or any other unit of distance that a user of the system may determine to be useful. The data source may provide an indication of where data for a given property comes from, such as the lease or other source of information. The transaction date may be the lease date for a comparison site 1804. The lease price per square foot (PSF) rate may be expressed in dollars or other currency. Furthermore, the lease PSF may indicate the price per square foot of the particular property, e.g., subject site 1802 or comparison sites 1804.

The center name, center type, and center condition may all be indications of what center or location the subject site 1802 is located in. Store signage information may provide information on the sign-related advertising for the site. Position type, positioning, and store visibility to street may provide information on the set up of the subject site 1802. Center ingress/egress provides information on how potential customers may access the property. Center vacancy provides information on vacancy rates, which may impact traffic to the property. The leasing space size may directly impact total cost and may be an important factor in deciding on a property to lease. The site monument/pylon information relates to on-site signage. The parking available and center traffic may impact abilities for customers to reach the site. The trade area may be a geographic area within which a business enterprise or center of retail or wholesale distribution draws most of its business, the wholesale trading area for groceries of the city, a department store's trading area, or the trading area of a shopping center. The density designation may indicate the population within a given geographical areas surrounding the subject property.

The total dollar adjustment for various items may be a space for entering various monetary adjustments that may be defined by a user and may be named within the calculator, e.g., "Comp Variance Adjustment—InsertImpact by Dollar Amount on Per Sq Ft Basis." Contrary to the name, "total dollar adjustment . . . ," it will be understood that other suitable units of monetary value may be used, rather than dollars.

Store signage information may include one of "superior," "above average," "average," "below average," or "inferior." These may be indications based on opinion. To provide a more consistent and objective standard of assessment, the administrative capabilities of the system allow to define the elements required for the rating (distance of visibility, degrees of visibility, etc.) or to provide help files providing the definition of each rating. The variable being scaled may have a nominal value that is populated in the calculator, such as parking stalls per 1000 square feet of retail, or average household income for a defined geographic area of a one-mile radius around the subject property. The tool has preset scales based upon the profile of the user. However, the system also has a library of templates that can modify the preset scales based upon selections made by the administrative tool.

If the preset scales or library template scales do not adequately address the specific attributes of the business or the user or of the independent variables being utilized by the specific parameters of the needed analysis, the administrative tool can be used to determine what the appropriate scale would be and to implement it within the system. For instance, the system can present a preconfigured scale for parking ratios, so that ≥8 per 1000 sq. ft. was Excellent (a score of 5), 5-7 per 1000 was Above Average (a score of 4), etc. However, Retailer "B" owns a chain of movie theaters and has intensive parking requirements. Therefore, the parking ratio ratings can be recalibrated to reflect this, so that ≥12 per 1000 sq. ft. was Excellent (a score of 5), 9-11 per 1000 was Above Average (a score of 4), etc.

Figure 19:
FIG. 19 is a diagram illustrating an example model of a comparable market rent calculator input and output screen in accordance with an exemplary embodiment.

With reference now to FIG. 19, in various exemplary embodiments an exemplary Comparable Market Rent Calculator 1900 is illustrated. Within Comparable Market Rent Calculator 1900, the data has now been collected and properly scaled. Now the data can be normalized relative to the subject property. Because no two real estate properties are identical, the variations between properties may be normalized. Comparative Market Rents typically has an extremely high correlation with the rent rate that will be established for the subject property. On the scatter plot the X axis shows value of the percentage that the rent rate of the subject property is relative to the mean average of the comparable properties' rent rate. The Y axis shows the actual results of the transaction in the percentage amount that the rate for the subject property was adjusted. The diagram illustrates a strong positive correlation by the application of linear regression. For example, if the subject property had a rent rate that was 3% below the mean average of the other properties that were compared, then there is a high likelihood that the results of the transaction will result in an increase of 3% for the rent rate of the subject property. This is a result of the analysis of prior transactions which shows that there is an extremely strong correlation between this independent variable and the dependent variable and therefore the likelihood of the results being similar in future transactions is extremely high.

However, the results may not be valid unless the data is scaled and normalized between the attributes and associated values of the subject transaction to that of the comparable properties. For example, the subject property has a Positioning Type of "Inline" while Property Number 3 has a Position Type of "End Cap". An End Cap has a higher percentage of store frontage relative to total store square footage and therefore a more desirable location. Therefore, End Caps command a greater lease rate rent than a In Line location on a per square foot basis. By using data from past transactions from an industry-based data lake of similar transactions, or by using past transactions from the user's portfolio, or both, an adjustment can be calculated and applied. For instance, if the data established that End Caps averaged 3% more in rent rate than an In Line, all other factors being equal, then the rent rate of Property 3 would be reduced by 3%. The same approach would then be applied to all of the variables being utilized in the calculator, and the results would then be normalized to provide the highest degree of accuracy possible in the utilizing the outcome in predicting the future rent rate established by the transaction to renew the lease on the subject propel ty. The process may be repeated for each of, for example, the ten composite variables, using an analytic calculator or series of calculators to arrive at a set of values.

With an exemplary system, "widgets" may be used to daisy chain any series of calculators utilized to arrive at the outcome. In this context, a widget may be a small software application that is designed to provide a specific piece of information (such as population, or traffic counts) or a specific function (such as taking notes or controlling another application) on demand. For instance, if a user it collecting data regarding the attributes of the shopping center that subject property is located, they would be populating the calculator based upon physically observable features such as availability of parking (e.g., parking stalls per 1000 square feet of retail space). However, when assessing a trade area in which the subject property is located, the population within a prescribed radius (e.g., 3 miles) maybe be needed to be collected as an input for a value for an independent variable. The administrative tool allows for the calculator to have a specific capability relative to that one variable to retrieve from a data table a value or to run a routine to establish a value and then populate that value within the applicable field within the calculator.

Figure 11A:
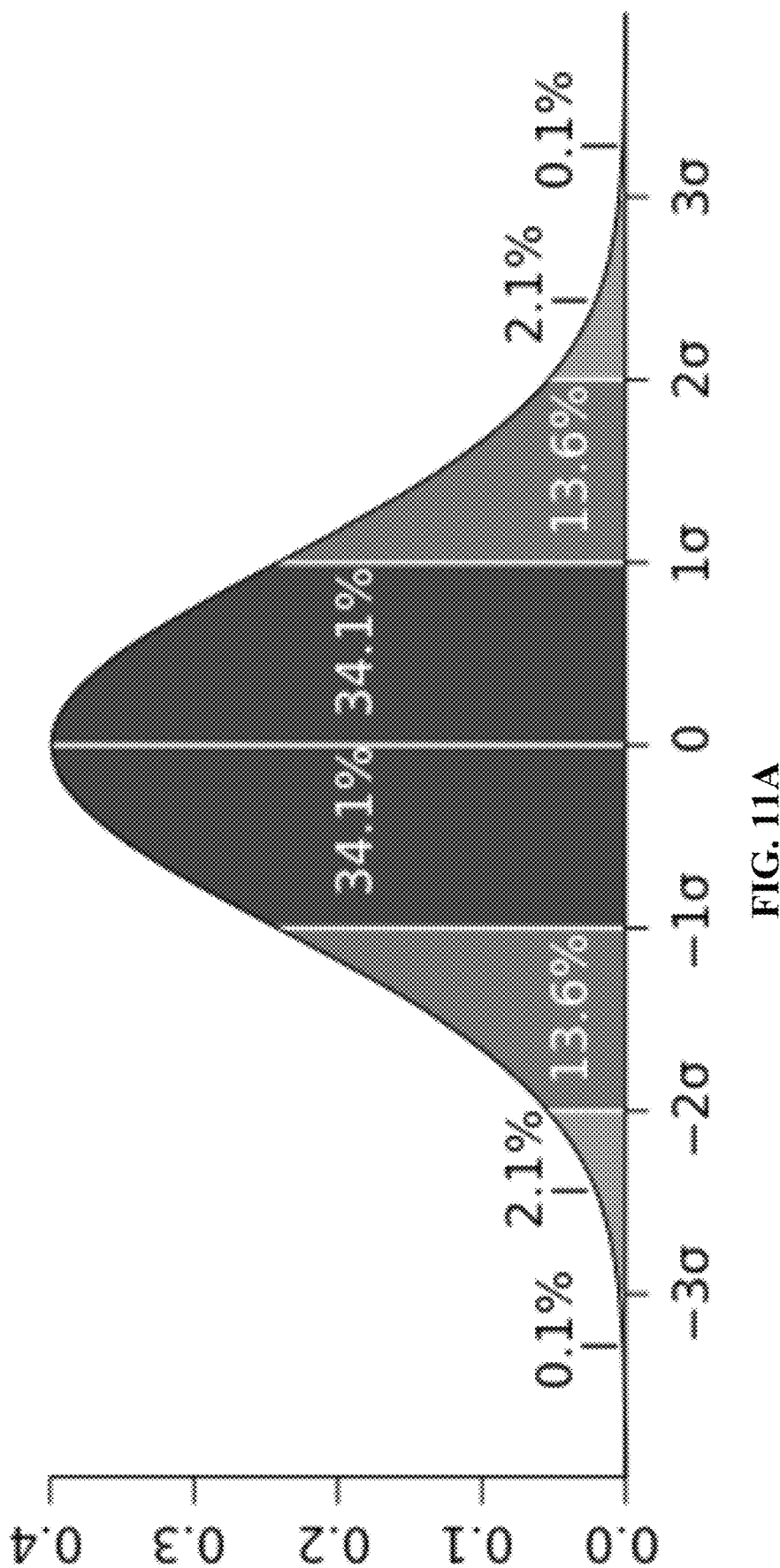
FIG. 11A illustrates an example normal distribution curve.

Using the widget to obtain population data, the data is now present in the calculator as a nominal value, such as a population density of 500 per square mile. The nominal value is now desirably scaled in order to provide the appropriate value. The administrative tool allows for the administrator to visualize the results of all nominal value fields to determine the appropriate scale. For instance, the results may be a normal distribution curve as illustrated in FIG. 11A.

Accordingly, the administrative tool can be used to set $2\sigma$ to $3\sigma$ as a value of 6, $1\sigma$ to $2\sigma$ as a value of 5, etc. If the distribution curve was flat, forming a uniform distribution, then segmentation may be done with quintiles or deciles. The ability to determine the distribution of a nominal value for the entire population of values from prior transactions and structure how any given nominal value is scored pursuant to the appropriate distribution curve is critical for the accuracy of the predictive model that will determine the forecasted rent rate. Static models cannot accommodate the endless set of possibilities and of values that any give user can require as an element of their own unique model based upon their business requirements and the specifics of their portfolio and business strategy.

A widget may move data from one calculator to another and add additional data as required to perform the statistical analysis. Once all data sets have been scaled, weighted, and normalized they are then assembled with the lease rent predictor where, again, weightings are calculated and applied to the scores of the composite variables, and the rent rate is predicted. In the example, the Comparable Rent Analysis is given a significant weighting due to the high correlation that it has. As previously presented, this may be established by the graph illustrated in FIG. 7A.

Figure 8A:
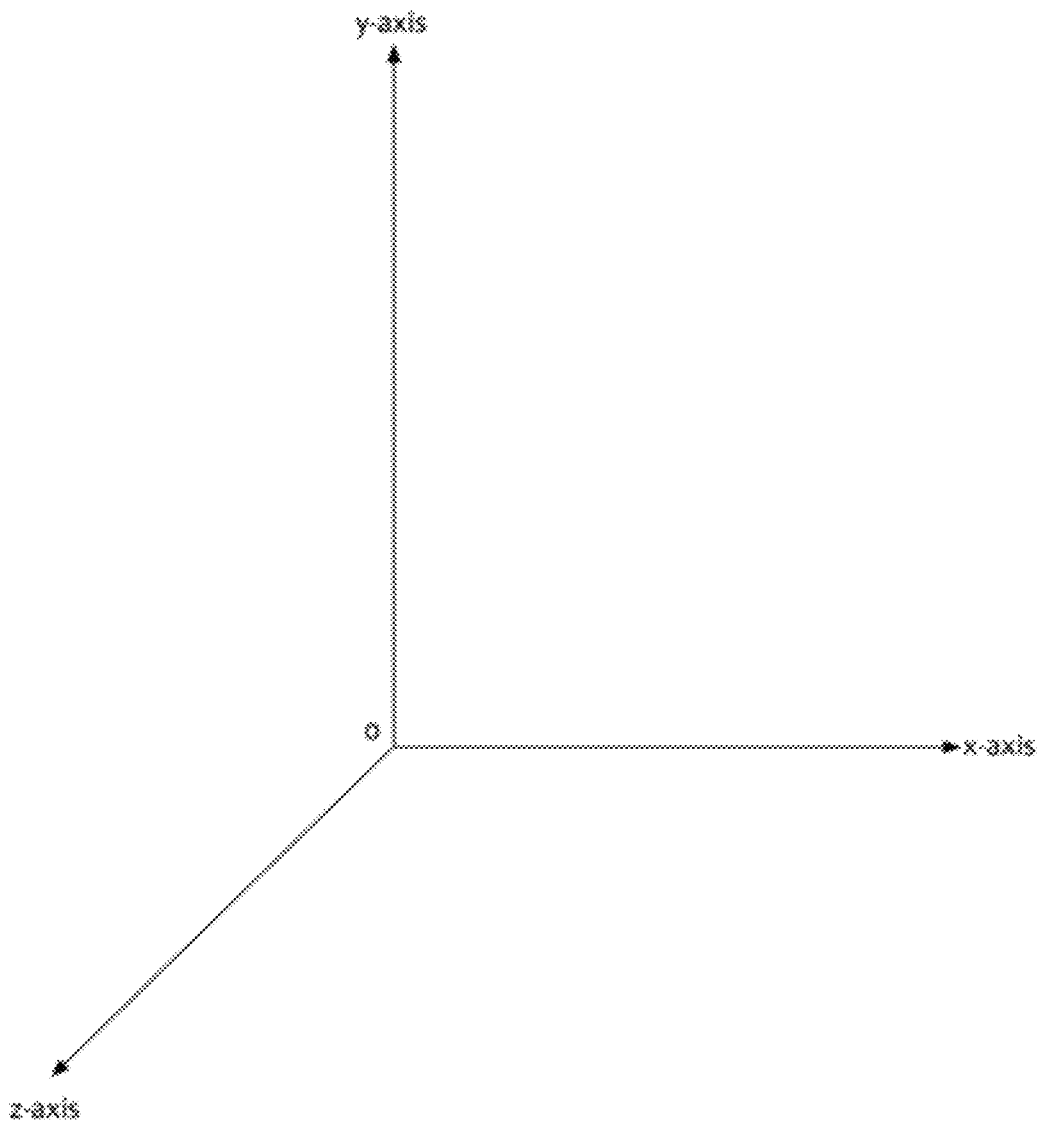
FIG. 8A illustrates a three-dimensional graph.

If the value of predicted rent rate was based solely upon a single variable, that being the comparable market rate, then the predicted value would be where the value of X intersected with the value of Y on the sloped line, as c represents the correlation. However, the comparable market rate variable is not the only variable as it just assesses the attributes of the physical properties and there are other variables that effect the total outcome. For instance, the Landlord may be undercapitalized and under financial duress, which is a variable that was not factored into the analysis of the comparable market rates. The Landlord maybe extremely well capitalized and maybe be assessing the tenant mix that they are trying to obtain within the center, and the proposed subject is not desirable according to the landlord's desired mix. Therefore, one would expect that the landlord would be in a position to achieve a higher rent rate than the comparable market rent rate analysis would indicate. This presents a third dimension as illustrated in FIG. 8A.

Figure 9A:
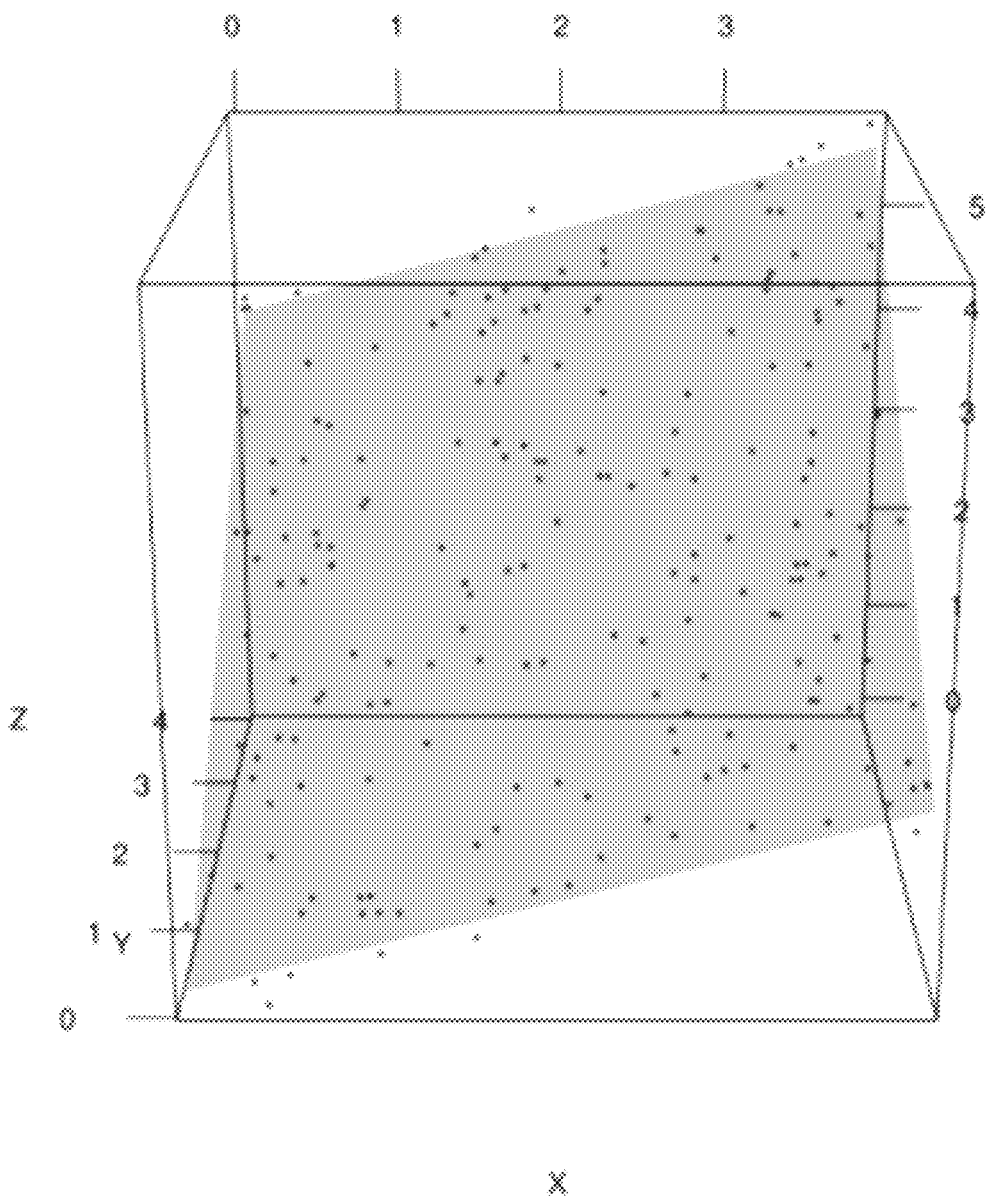
FIG. 9A illustrates a multiple dimension, multivariate regression model.

To analyze multiple dimensions, in various exemplary embodiments a multivariate regression model may be utilized which can be illustrated as seen in FIG. 9A. The X axis still represents the independent variable of the range of values for the comparable market rates, and the Y axis still represents the predicted rent rate, but now the Y axis is included to incorporate the impact of that independent variable on the outcome.

Figure 3:
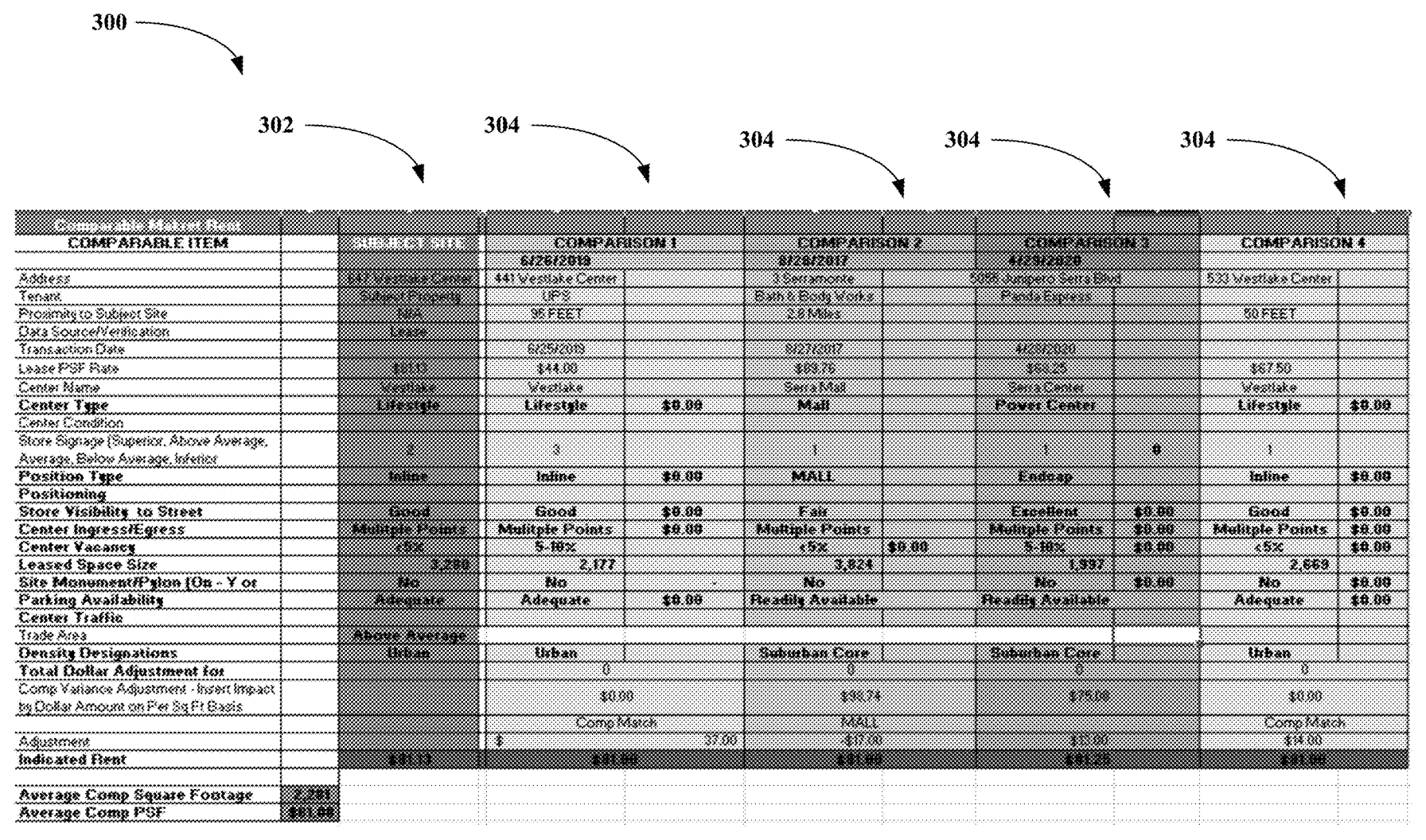

FIG. 3 illustrates another exemplary model 300 of an analytic calculator input and output screen in accordance with various exemplary embodiments. The calculator may include inputs 302 such as one or more of the Composite Scores for the independent Variables, such as market, trade area, lease quality, store, center, landlord strength, strategy, and comparable rent analysis. The inputs 302 may be scored 304 using a scoring, e.g., 1 to 5 (or other scale). The inputs 302 may be adjusted using an adjustment factor or weighting to arrive at a weighted adjustment to arrive at results.

Figure 4:
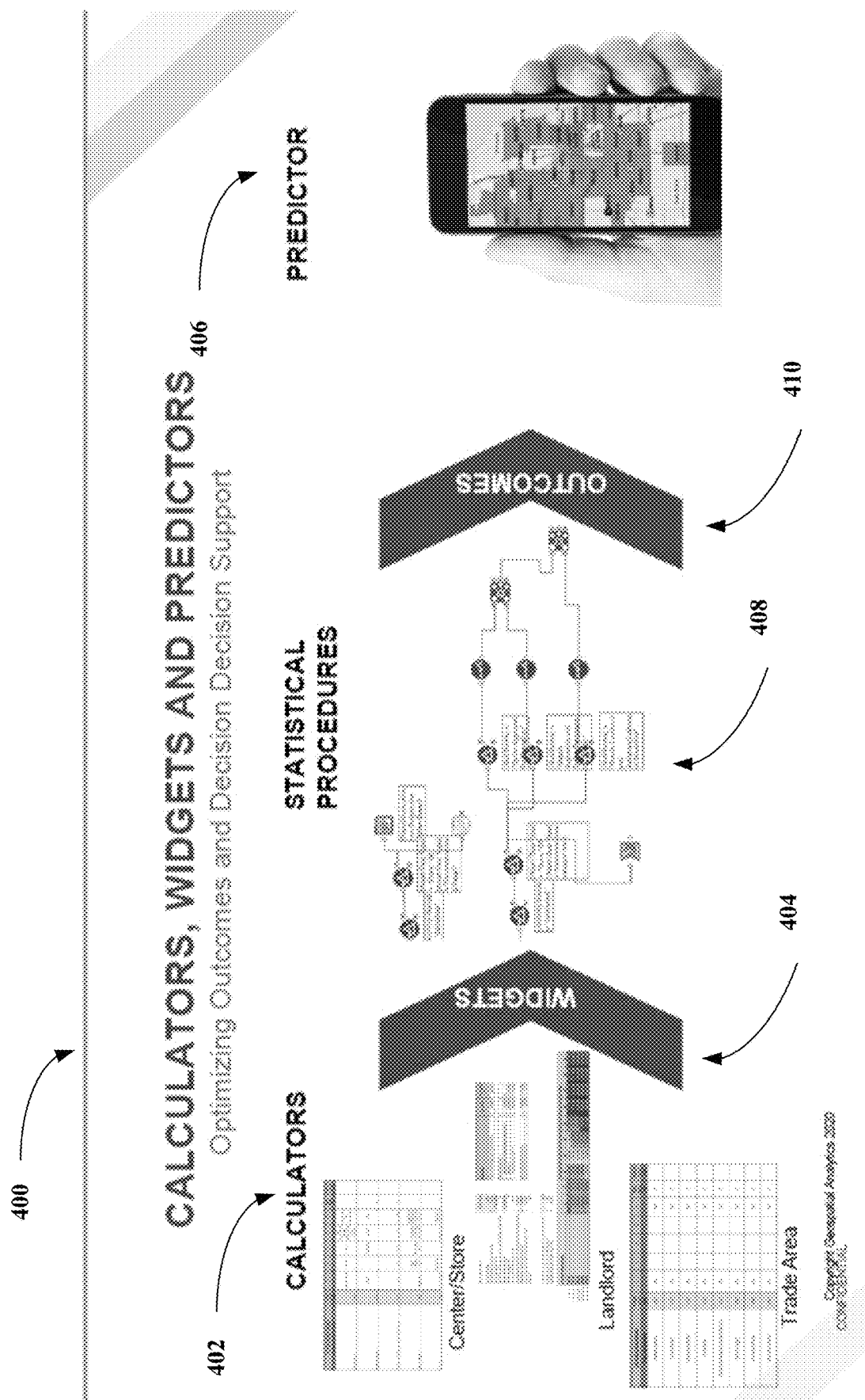
FIG. 4 illustrates an exemplary model using a combination of calculators, widgets, and predictors in accordance with an exemplary embodiment.

In accordance with an exemplary embodiment, FIG. 4 illustrates an exemplary model 400 using a combination of calculators 402, widgets 404, and predictors 406. The model 400 may use statistical procedures 408 to determine the outcomes 410 for the predictors 406. The calculators 402 may include one or more of the calculators illustrated herein, or other calculators or variations of the calculators illustrated herein. Additionally, as discussed above, statistical procedures 408 may include, but are not limited to ordinary least squares, GLM, logistic regression, random forests, decision trees, or multivariate adaptive regression splines, depending upon which is the best fit for any given analysis performed throughout the sequence of calculations performed in the end-to-end process.

The predictive model may be constructed to predict the outcome of a lease renewal negotiation. For example, the predictive model may predict various lease terms, such as the cost of the lease, the length of the lease, or other requirements or attributes of the lease. The predictive model may also be constructed to predict a lease acquisition rent rate, or the "buy out" rate for a lease termination. These capabilities allow users to use the predicted outcomes to build business cases, assess portfolio strategy, forecast budgets, measure the performance of service providers and support other business processes and decisions.

Figure 5:
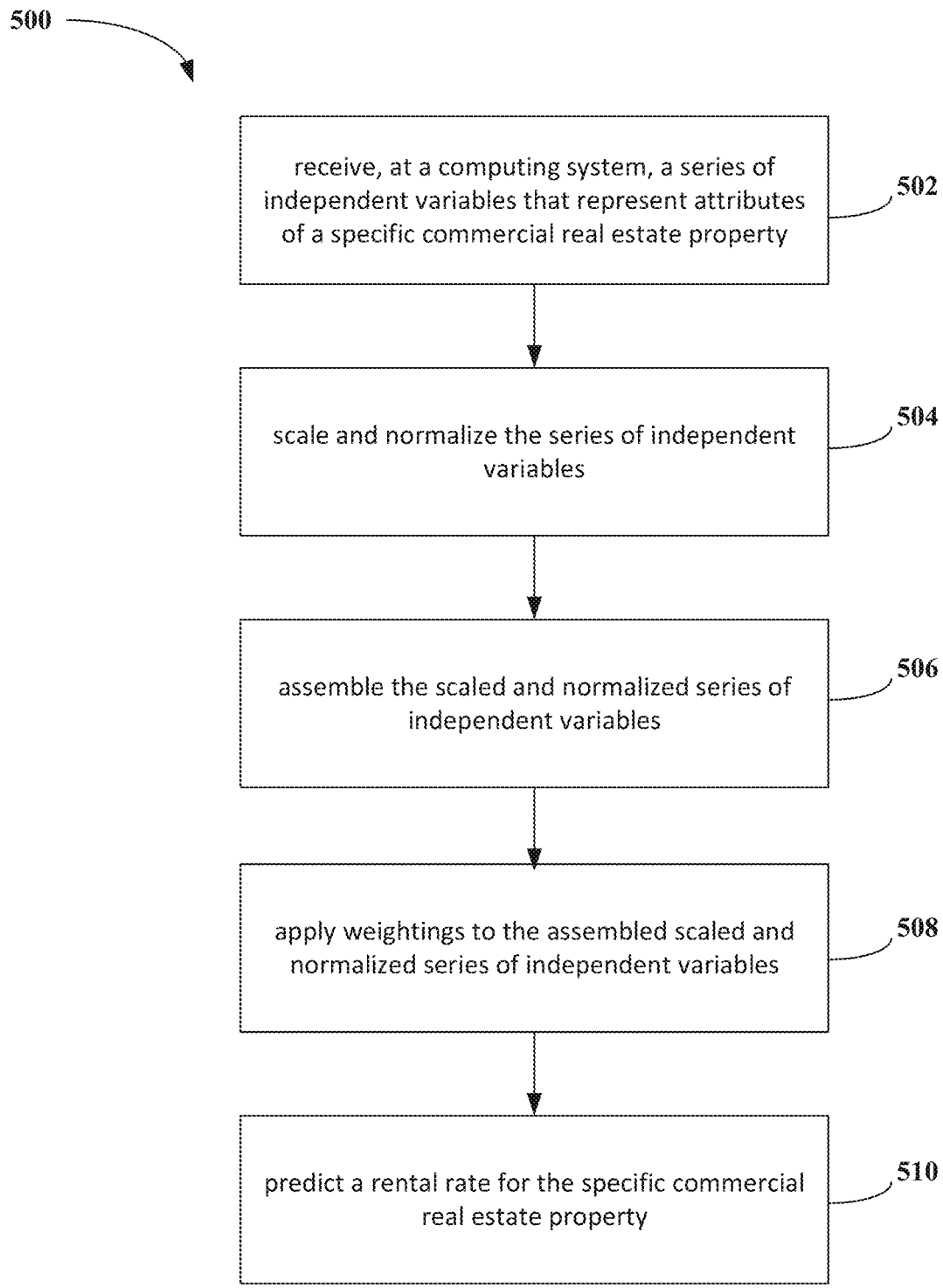
FIG. 5 is a flow chart illustrating an exemplary method in accordance with an exemplary embodiment.

In accordance with various exemplary embodiments, FIG. 5 is a flow chart illustrating an exemplary method 500 disclosed herein. The method 500 may be a method of forecasting commercial real estate lease rent rates. The method includes receiving, at a computing system, a series of independent variables that represent attributes of a specific commercial real estate property (502), scaling and normalizing the series of independent variables (504), assembling the scaled and normalized series of independent variables (506), applying weightings to the assembled scaled and normalized series of independent variables (508), and predicting a rental rate for the specific commercial real estate property (510).

Receiving the series of independent variables that represent attributes of a specific commercial real estate property (502) may include receiving a signal used to transmit the series of independent variables and processing the signal used to transmit the series of independent variables to extract the series of independent variables. Generally, the signal may be any wired or wireless signal that may be used to transmit series of independent variables. Accordingly, the systems described herein may include an appropriate receiver or transceiver to receive such signals.

Scaling and normalizing the series of independent variables (504) may include transforming the series of independent variables such that the features are within a specific range (scaling) and changing the shape of the distribution of the independent variables.

Assembling the scaled and normalized series of independent variables (506) may include combining the scaled and normalized series of independent variables into a data set. For example, each of the series of independent variables that have been scaling and normalizing may be a member of such a set.

Applying weightings to the assembled scaled and normalized series of independent variables (508) may include multiplying each member of the assembled scaled and normalized series of independent variables by one or more numbers or "weights," For example, member of the set of assembling the scaled and normalized series of independent variables may be multiplied by a weighting factor.

Predicting a rental rate for the specific commercial real estate property (510) may include forecasting the rental rate for the specific commercial real estate property based on one or more of the assembled scaled and normalized series of independent variables as compared to prior outcomes which have similar attributes.

In an example, the series of independent variables may include, but is not limited to, at least one of market, trade area, location, type of center, asset, lease, landlord, comparable assets, negotiator, and strategy. In an example, the series of independent variables may include, but is not limited to at least one composite variable of multiple variables. The method 500 may be repeated for a series of specific commercial real estate propel ty forming a portfolio or a sub-portfolio.

An example embodiment of the systems and methods described herein may include a device for forecasting commercial real estate lease rent rates. The device for forecasting commercial real estate lease rent rates may include at least one processor and a memory. Accordingly, the systems and methods described herein may be implemented in a processor-based device. For example, the method described with respect to FIG. 5 may be implemented using the at least one processor. The at least one processor may implement one or more of the steps of FIG. 5. In some example embodiments, the steps of FIG. 5 may be executed across multiple processors. Moreover, in various exemplary embodiments, data from method 500 may be utilized in connection with offering, negotiating, closing, or otherwise communicating or taking action with respect to a lease for an item of real property.

Modifying Analytic Calculator Library Calculators (No Code Platform)

Figure 6A:
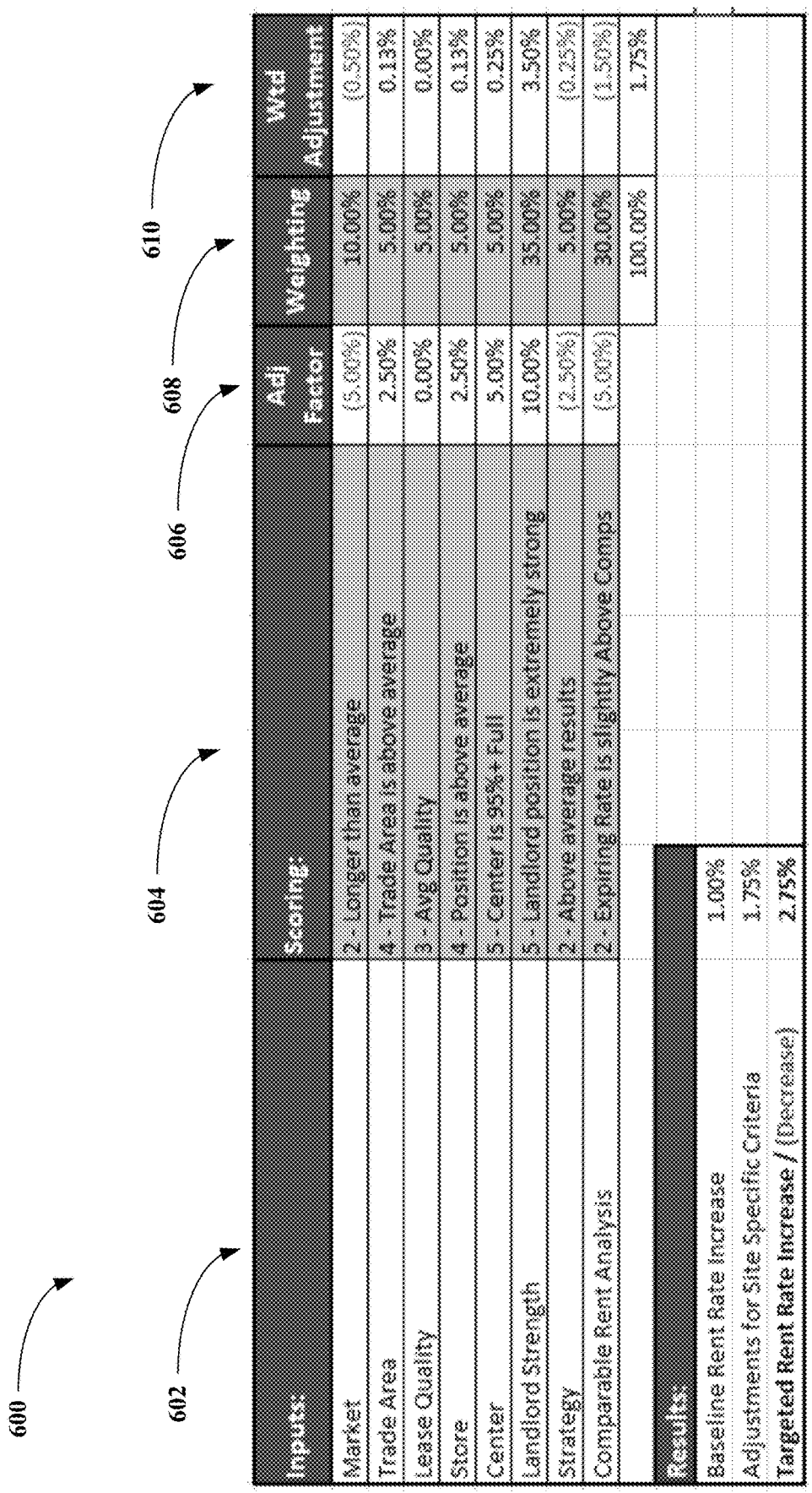
FIG. 6A illustrates another exemplary model of an analytic calculator input and output screen in accordance with an exemplary embodiment.
Figure 6B:
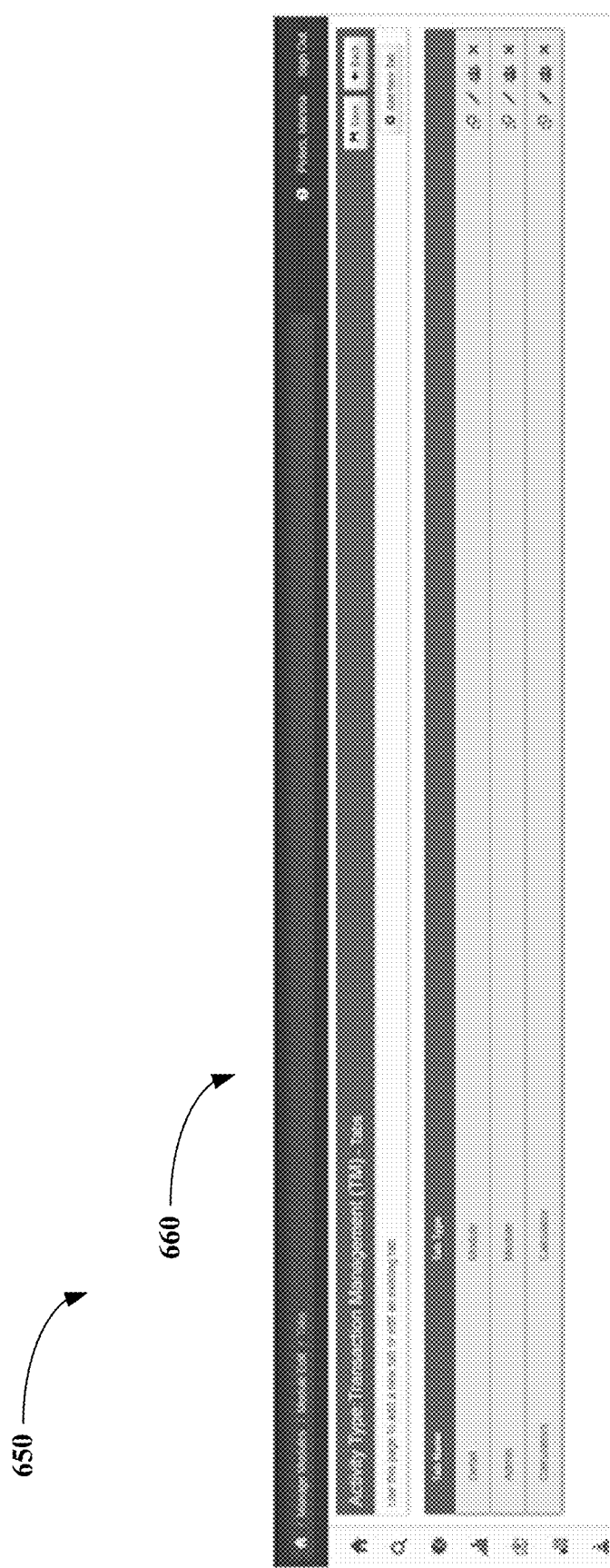
FIG. 6B illustrates an exemplary low code platform 660 for analytic calculator 650 modifications, in accordance with an exemplary embodiment.

FIG. 6B illustrates an exemplary low code platform 660 for analytic calculator 650 modifications, in accordance with an exemplary embodiment. The analytic calculator 650 may include a library of calculators in which the user can directly select the appropriate calculator, or can utilize the AI capabilities of an analytic calculator 650 to have the application determine the appropriate calculator. However, business contracts and contract requirements are constantly evolving. It may be desirable for an analytic calculator to be able to quickly adapt to new variables of any given financial provision of a contract. To fulfill this need, an analytic calculator 650 may provide a no code platform 660 for calculator modifications. No code is a visual approach to software development. No code abstracts and automates steps in the application development that enables rapid delivery of software solutions without knowing traditional programming languages. Trained users can use the administrative tools to create and modify areas of the software application (see FIG. 6B). For instance, if the underlying algorithm to a specific calculator was $(a \times b)+c=\Sigma$, the user can modify the operators and order of operations by modifying the precedence rules to create $a+(b \times c)=\Sigma$. If new variables were needed (d) those can be added as well, such as $a+(b \times c)\ d=\Sigma$.

Module Library and Saving Analytic Calculator Data Inputs and Outputs

Figure 7A:
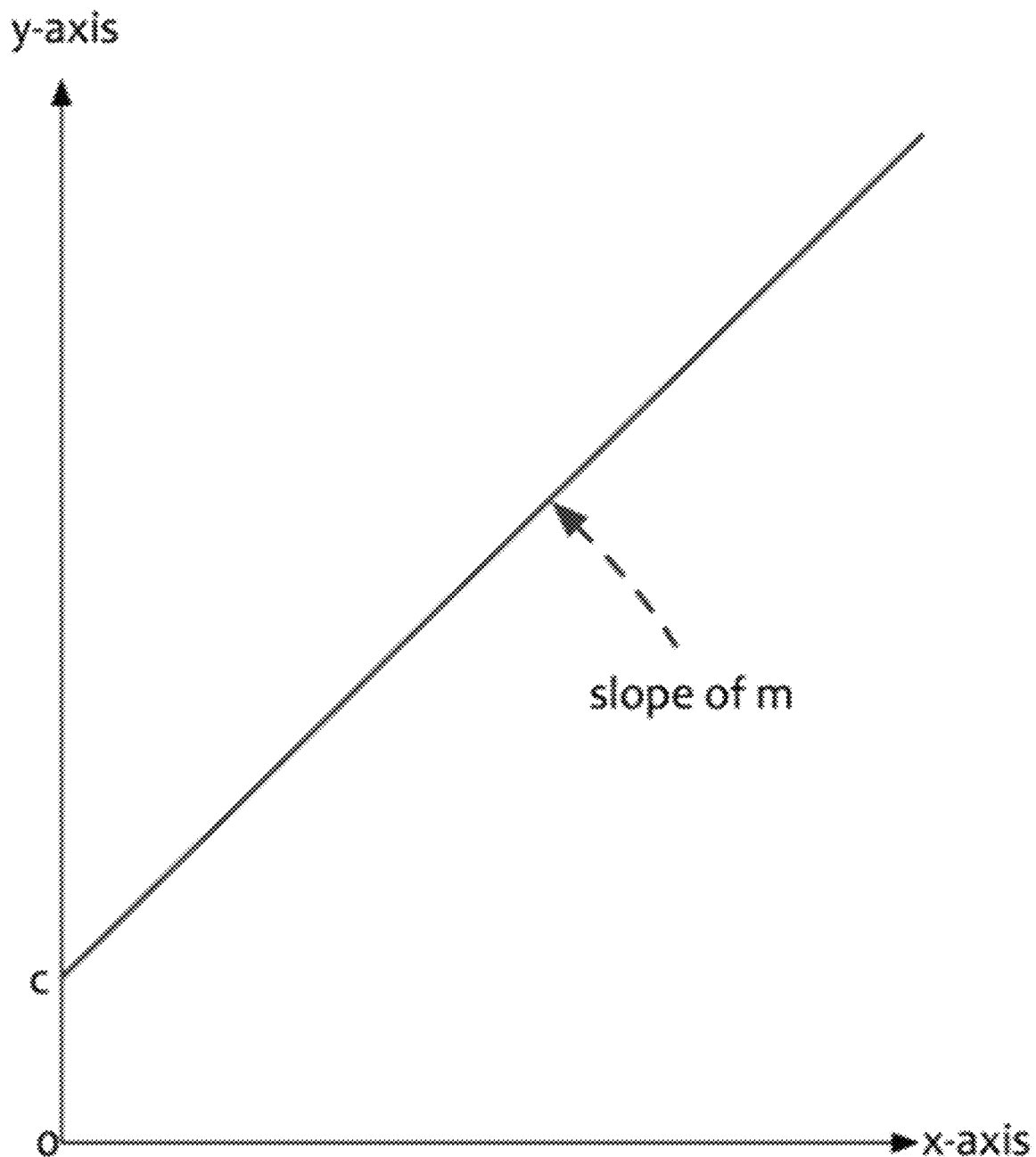
FIG. 7A illustrates a comparable rent analysis graph.
Figure 7B:
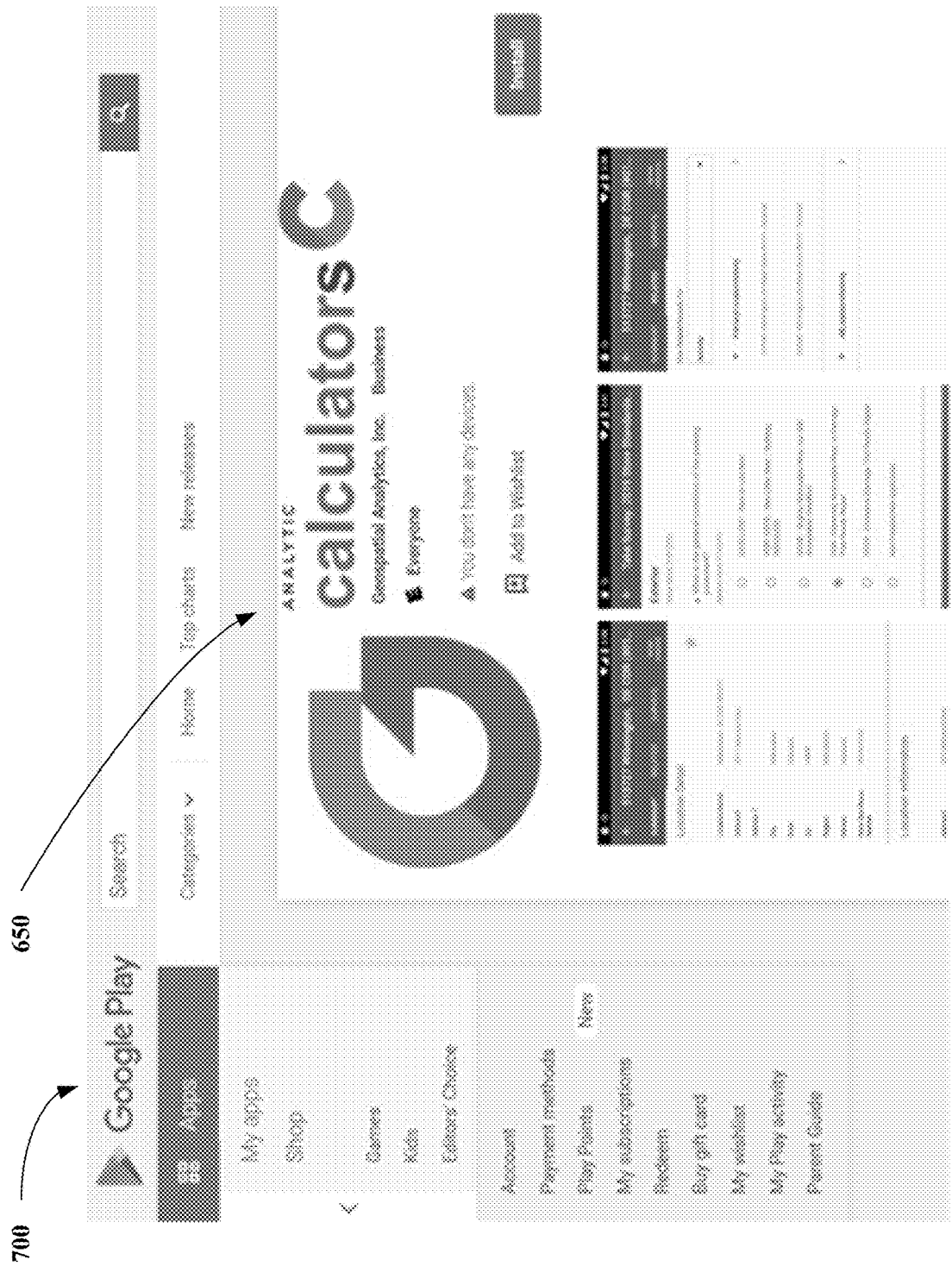
FIG. 7B illustrates an on-line app library including analytic calculator available for download onto a mobile device.

FIG. 7B illustrates an on-line app library 700 including analytic calculator 650 available for download onto a mobile device. The analytic calculator 650 may be available as a mobile app in on-line app libraries, such as the Google Play Store, among others. As such, the user can use the app independently of any other software application or data sets. At the user's discretion, the output of an analytic calculator 650 from its operation on the mobile app can be sent to the email address of the user in various formats such as .xls or .pdf. However, should the user need to save the data from the output of an analytic calculator for future analysis, or desires that other data sets be used in conjunction with an analytic calculator, then the user has the ability to utilize the module library on the web application. The module library provides a number of structured data elements withing a graphical user interface that allows for the data elements to be saved, as well as additional data to be added and subsequently modified (see FIG. 8B).

Figure 8B:
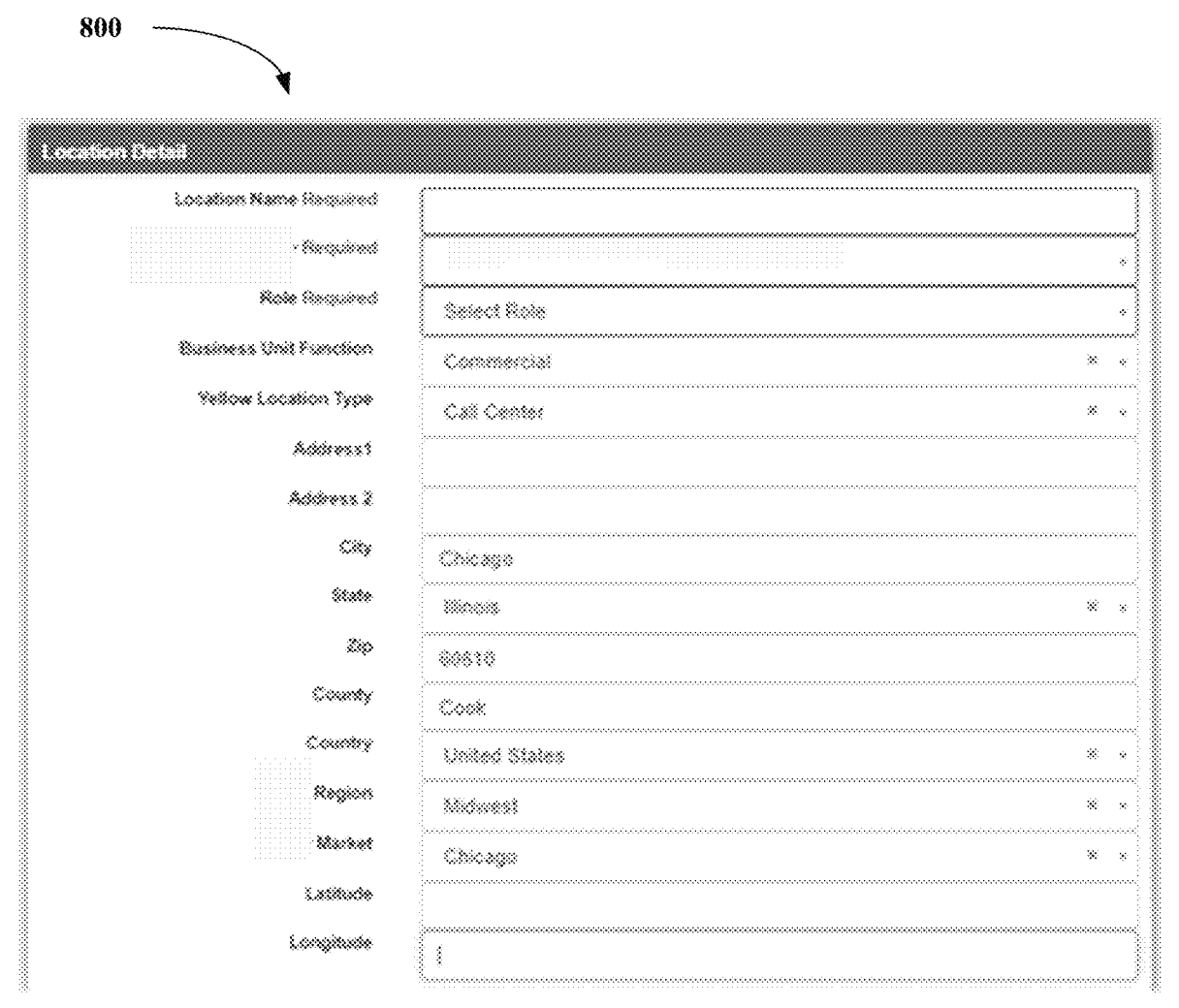

FIG. 8B illustrates an exemplary location module 800 for an analytic calculator, in accordance with an exemplary embodiment. A user may input data such as location name, role, business unit function, location type, address, city, state, zip code, county, country, region, market, latitude, longitude, etc. into the location module. This data may be saved into memory for later use.

Modifying and Creating Modules for Data Variables

Figure 9B:
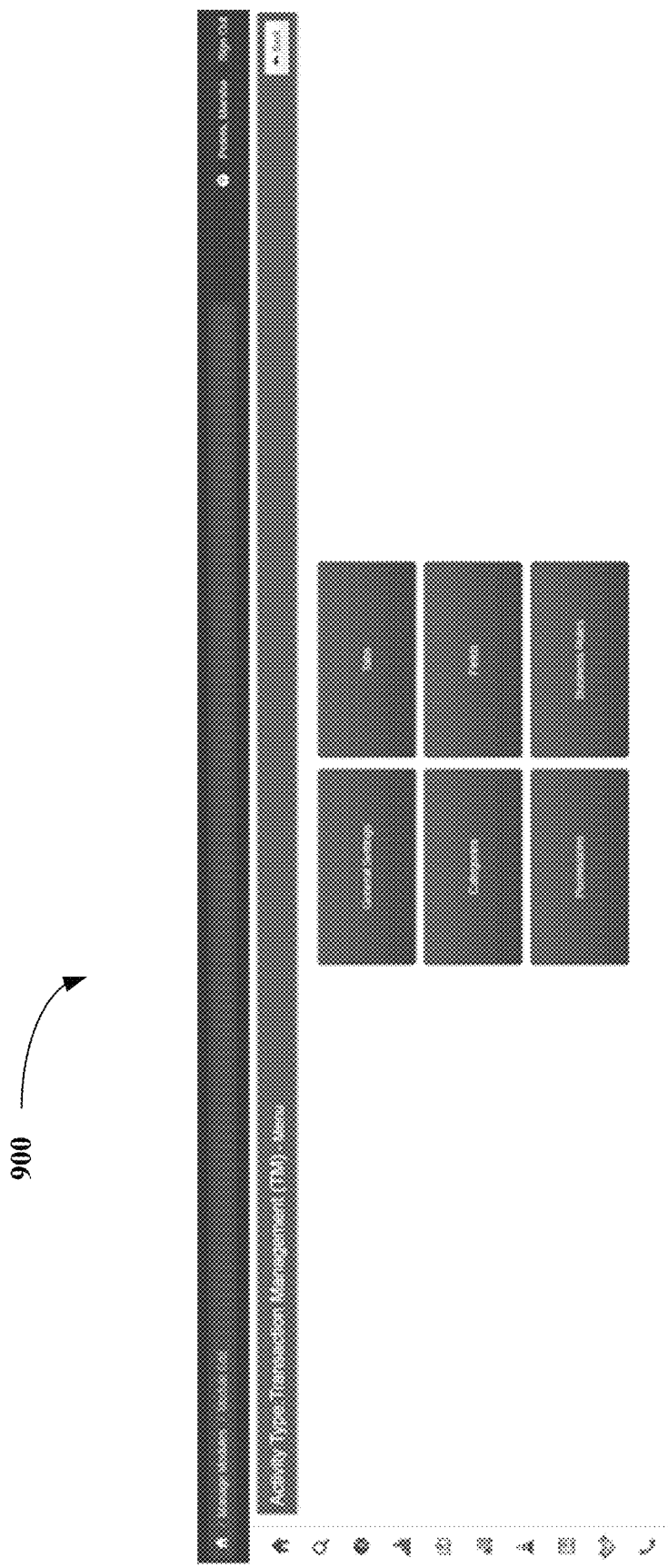
FIG. 9B illustrates an exemplary module creation menu for an analytic calculator, in accordance with an exemplary embodiment.

FIG. 9B illustrates an exemplary module creation menu 900 for an analytic calculator, in accordance with an exemplary embodiment. The web software application may provide for the same no code platform for the creation and modification of modules. If new data elements are desired, they can be added as well to the module selected from the module library, Using the administrative tool, a user can even create new modules to fulfill business requirements (see FIG. 9B).

Importing and Using Alternative Data Sets within the Analytic Calculators

Figure 10A:
FIG. 10A illustrates data extraction, transform and load capabilities for an analytic calculator, in accordance with an exemplary embodiment.
Figure 10B:
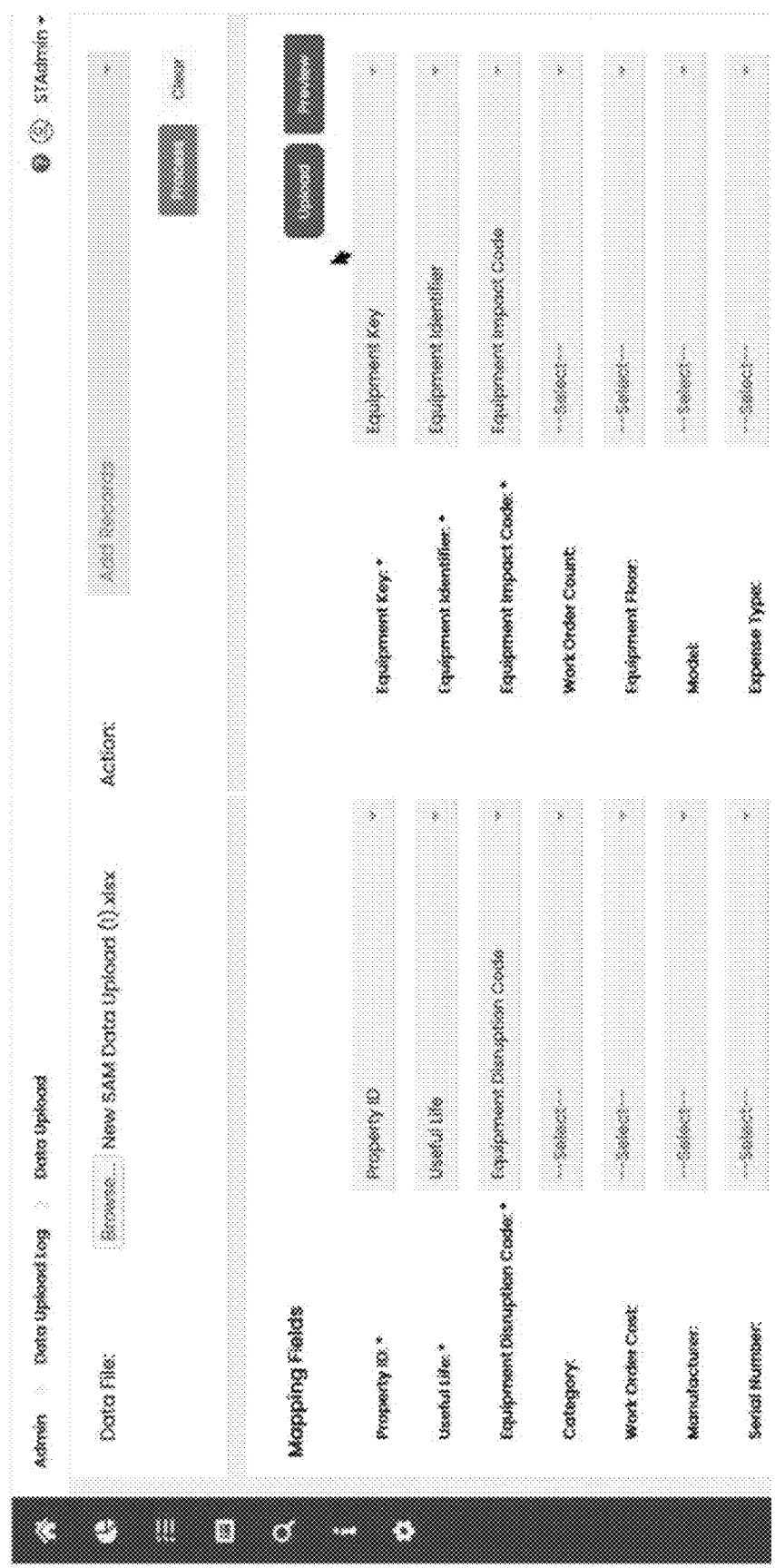
FIG. 10B illustrates data mapping in accordance with various exemplary embodiments.
Figure 10C:
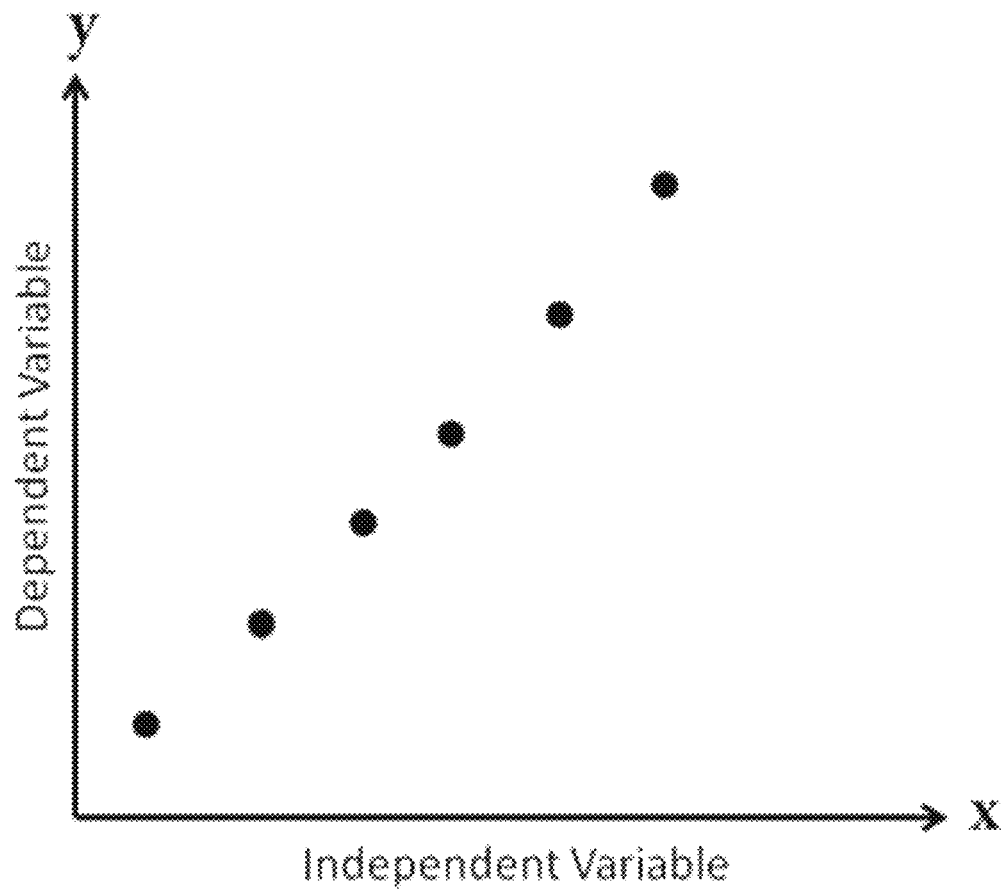
FIG. 10C illustrates a scatter plot with the x-axis showing values of the percentage that the rent rate of the subject property is relative to the mean average of the comparable properties' rent rate and the y-axis showing the actual results of the transaction as a percentage amount that the rate for the subject property was adjusted.

FIG. 10A illustrates data extraction, transform and load capabilities 1000 for an analytic calculator, in accordance with an exemplary embodiment. Should the user have the need to reference or use other data sets from other databases or sources, an analytic calculator offers that ability to easily do that through the administrative tool. In computing, extract, transform, load (ETL) is the general procedure of copying data from one or more sources into a destination system which represents the data differently from the source(s) or in a different context than the source(s). The ETL process is often used in data warehousing. Data extraction involves extracting data from homogeneous or heterogeneous sources; data transformation processes data by data cleaning and transforming them into a proper storage format/structure for the purposes of querying and analysis; finally, data loading describes the insertion of data into the final target database such as an operational data store, a data mart, data lake or a data warehouse. The data can be mapped from the source, such as a spreadsheet to the appropriate fields within the Module Records (see FIG. 10B).

Being able to load other data sets within an analytic calculator allows the user to leverage content such as prior financial transactions, all of the locations within a real estate portfolio, and other important information.

Assessing a Portfolio of Historical Transaction Types

Figure 11B:
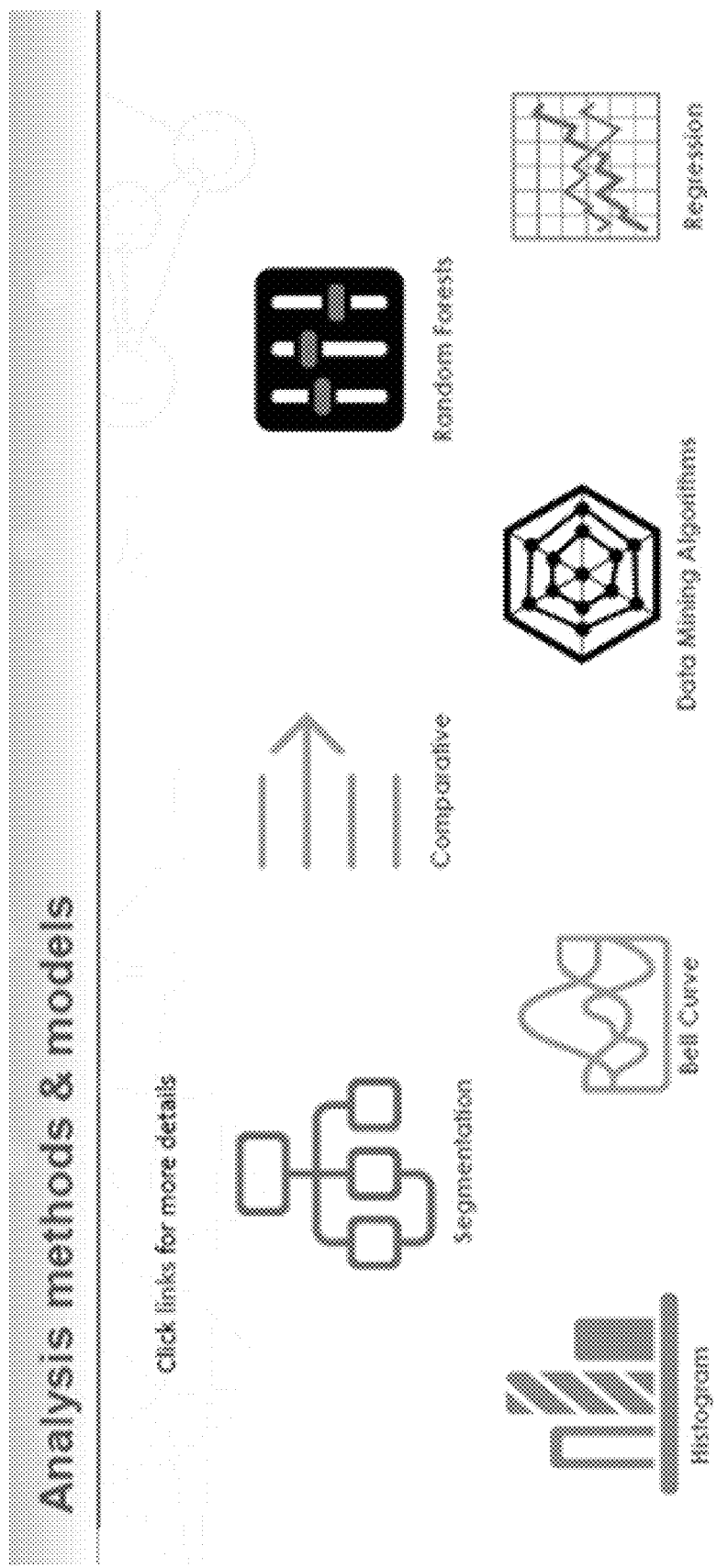
FIG. 11B illustrates examples of statistical methods utilized in an analytic calculator; in accordance with an exemplary embodiment.

FIG. 11B illustrates examples of statistical methods utilized in an analytic calculator, in accordance with an exemplary embodiment. These examples include segmentation analysis, comparative analysis, random forests analysis, histogram analysis, bell curve analysis, data mining algorithms, and regression analysis. If the user creates a large data set of financial transactions either from using an analytic calculator or importing historical records (or both), the entire data set can now be systematically analyzed using an analytic calculator. For instance, the NPV of all prior leases can now be calculated. This creates the capability of additional comparative analysis to be made to transactions currently being analyzed, or historical trends and patterns. For example, a specific transaction can be viewed relative to any number of statistical methods, such as variance from the mean, within a pareto chart or within deciles of NPV values of the entire portfolio. The analytic calculator provides a statistics library to enable the user within the administrative tool to select different statistical methods, apply them to the output of a specific calculation and provide a result within the web application interface. This allows the user to have additional business intelligence regarding the transaction that is under consideration.

Analytic Calculator Data Lake, Data Mining and Crowd Sourcing

The data that is being created by use of an analytic calculator, subject to user permissions, may be stripped of confidential information and stored within a centralized database. Likewise, user modifications to the calculator library or module library may also captured. These data sets can then be made available to other users of an analytic calculator for use for further comparative analysis, statistical modeling, and data mining.

In its simplest state, an analytic calculator, as disclosed herein, can provide a user with a valuable solution to provide the optimal structure to a financial transaction. However, an analytic calculator is scalable and configurable, allowing it to be used for large volumes and diversity of transactions. The application may support the optimization of a financial outcome in a holistic manner that is a paradigm shift in the industry at large.

Figure 12A:
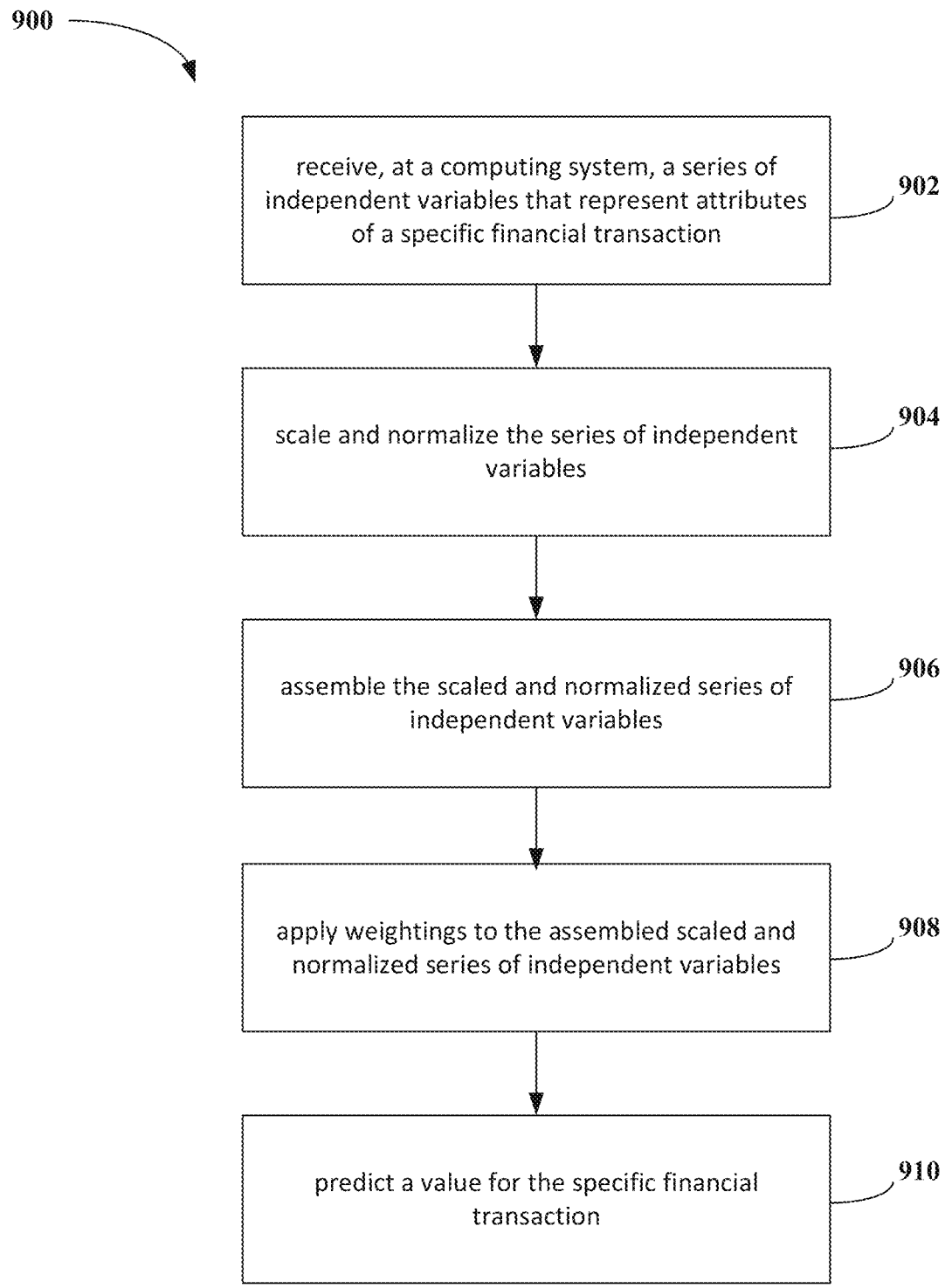
FIG. 12A is a flow chart illustrating an exemplary method.

FIG. 12A is a flow chart illustrating an exemplary method 900 disclosed herein. The method 900 is a method of forecasting commercial financial transactions. The method includes receiving, at a computing system, a series of independent variables that represent attributes of a specific financial transaction (902), scaling and normalizing the series of independent variables (904), assembling the scaled and normalized series of independent variables (906), applying weightings to the assembled scaled and normalized series of independent variables (908), and predicting a value for the specific financial transaction (910).

Receiving the series of independent variables that represent attributes of a specific financial transaction (902) may include receiving a signal used to transmit the series of independent variables and processing the signal used to transmit the series of independent variables to extract the series of independent variables. Generally, the signal may be any wired or wireless signal that may be used to transmit a series of independent variables. Accordingly, the systems described herein may include an appropriate receiver or transceiver to receive such signals.

Scaling and normalizing the series of independent variables (904) may include transforming the series of independent variables, such that the features are within a specific range (scaling) and changing the shape of the distribution of the independent variables.

Assembling the scaled and normalized series of independent variables (906) may include combining the scaled and normalized series of independent variables into a data set. For example, each of the series of independent variables that have been scaling and normalizing may be a member of such a set.

Applying weightings to the assembled scaled and normalized series of independent variables (908) may include multiplying each member of the assembled scaled and normalized series of independent variables by one or more numbers or "weights." For example, each member of the set of assembling the scaled and normalized series of independent variables may be multiplied by a weighting factor.

Predicting a value for the specific financial transaction (910) may include forecasting the financial value and/or consideration for the specific contractual agreement based on one or more of the assembled scaled and normalized series of independent variables as compared to prior outcomes which have similar attributes. Predicting a value for the specific financial transaction (910) may include predicting a score for the specific financial transaction (e.g., see FIG. 3).

In an example, the series of independent variables may include, but is not limited to, at least one of market, trade area, location, type of center, asset, lease, landlord, comparable assets, negotiator, and strategy. In an example, the series of independent variables may include, but is not limited to, at least one of purchase type (e.g., sale or lease), interest rate, and payment duration. In an example, the series of independent variables may include, but is not limited to at least one composite variable of multiple variables. The method 900 may be repeated for a series of specific contractual transactions forming a portfolio or a sub-portfolio.

An example embodiment of the systems and methods described herein may include a device for forecasting commercial real estate lease rent rates. The device for forecasting commercial real estate lease rent rates may include at least one processor and a memory. Accordingly, the systems and methods described herein may be implemented in a processor-based device. For example, the method described with respect to FIG. 12A may be implemented using the at least one processor. The at least one processor may implement one or more of the steps of FIG. 12A. In some example embodiments, the steps of FIG. 12A may be executed across multiple processors. However, the systems and methods described herein may include a device for forecasting any type of commercial transaction.

Figure 12B:
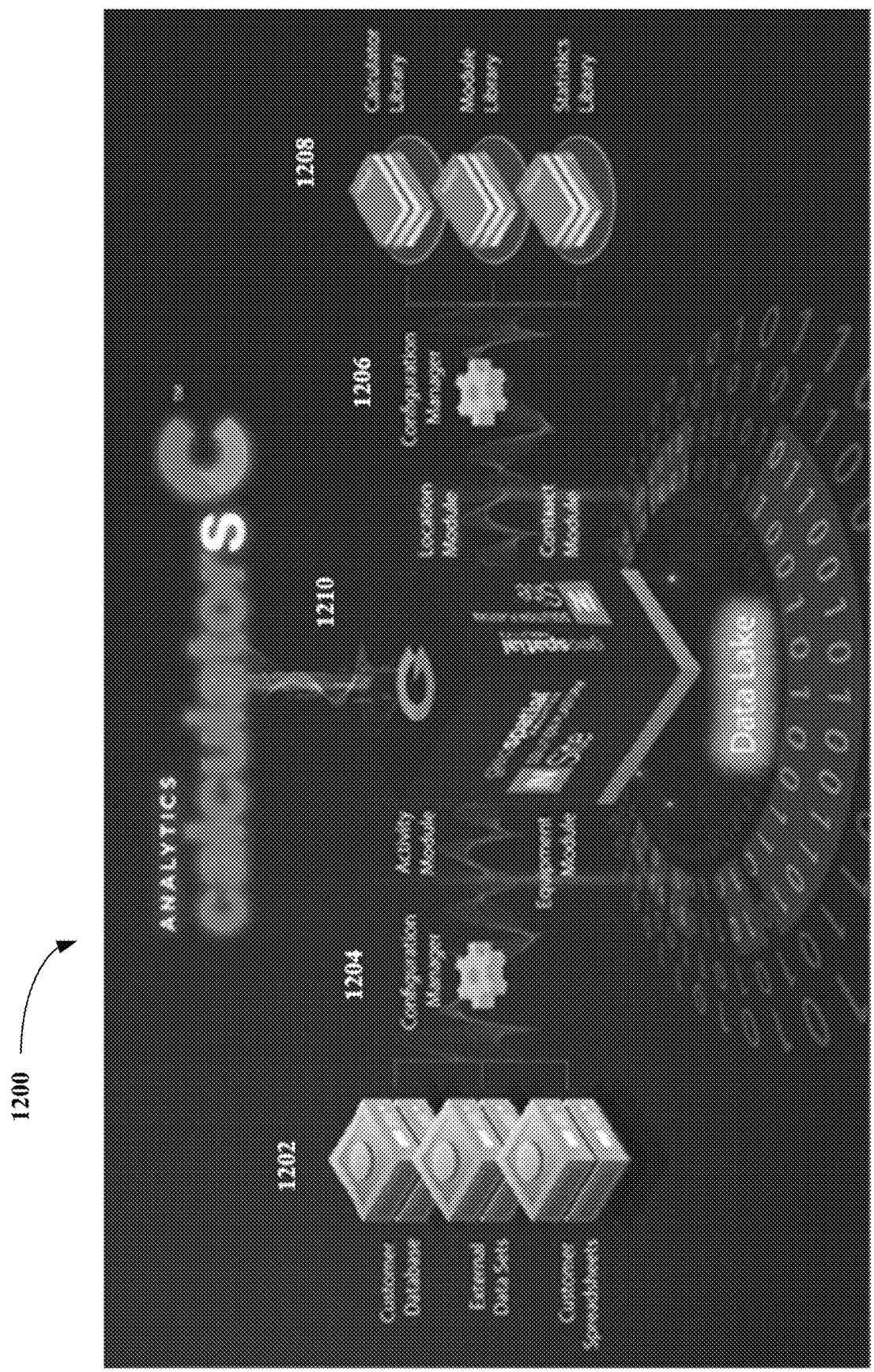
FIG. 12B is a system diagram illustrating an example system in accordance with the systems and methods described herein.

FIG. 12B is a system diagram illustrating an example system 1200 in accordance with the systems and methods described herein. The system 1200 includes databases, datasets, and spreadsheets 1202, configuration managers 1204, 1206, and an analytic calculator library, module library, and statistics library 1208. The system 1200 may include an analytics calculator 1210 that implements one or more systems or methods described herein, for example, a method of forecasting commercial real estate lease rent rates.

Various embodiments may be implemented as software and/or hardware, for example for execution on a system comprising at least one processor, a memory, and so forth. The at least one processor can be any suitable component which can execute instructions or logic, including but not limited to a micro-controller, microprocessor, multi-core processor, integrated-circuit, application specific integrated circuit (ASIC), field programmable gate array (FGPA), programmable logic device (PLID), or any appropriate combination of these components.

The memory may be coupled to the at least one processor. The memory may be any suitable component which can store instructions, logic, or programs, including but not limited to non-volatile or volatile memory, read only memory (ROM), random access memory (RAM), FLASH memory, registers, magnetic hard disk, optical disk, or any combination of these components. The memory may store processor executable instructions. Accordingly, the memory may include instructions causing the at least one processor to receive, at the device, a series of independent variables that represent attributes of a specific commercial real estate property. The memory may include instructions causing the at least one processor to scale and normalize the series of independent variables. Additionally, the memory may include instructions causing the at least one processor to assemble the scaled and normalized series of independent variables. The memory may also include instructions causing the at least one processor to apply weightings to the assembled scaled and normalized series of independent variables and predict a rental rate for the specific commercial real estate property.

In an example embodiment, the memory further includes instructions causing the at least one processor to apply at least one of ordinary least squares, GLM, logistic regression, random forests, decision trees, or multivariate adaptive regression splines.

In an example embodiment, the series of independent variables may include at least one of market, trade area, location, type of center, asset, lease, landlord, comparable assets, negotiator, and strategy. The series of independent variables may include at least one composite variable of multiple variables.

In an example embodiment, the memory further includes instructions causing the at least one processor to generate a composite score of the specific commercial real estate property, the composite score used as an independent variable in predicting the rental rate. The processing done by the at least one processor may be repeated for a series of specific commercial real estate property, forming a portfolio or a sub-portfolio. In an example embodiment, the device may be further configured to predict rental rates for the specific commercial real estate property for a plurality of lease periods. In an example embodiment, the device may be further configured to predict rental rates for the specific commercial real estate property for a plurality of lease periods. In an example embodiment, the device may be further configured to predict the rental rate for the specific commercial real estate property, including length of the term of tenancy.

It will be appreciated that outputs of exemplary systems may be utilized, for example, as part of rental contract offers, negotiations, and/or acceptances. Moreover, the results of exemplary methods may likewise be utilized in a similar fashion. Additionally, exemplary outputs may be used for planning purposes, decision-making related to real property acquisition and/or disposition, and/or the like.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, a computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, components, modules, and/or engines of the system may be implemented as micro-applications, micro-apps, micro-services, or the like. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The systems, computers, computer-based systems, and the like disclosed herein may provide a suitable website or other internet-based graphical user interface which is accessible by Users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX: (Asynchronous JAVASCRIPT and XML) programs, helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and LIMN. Web services methods are well known in the art, and are covered in many standard texts. As a further example, representational state transfer (REST), or RESTful, web services may provide one way of enabling interoperability between applications. In various embodiments, any communication discussed herein may be accomplished via the internet or an intranet. Communications may be completed using any suitable protocol, such as, for example, IPv4 (base 10), IPv6 (HMAC), and/or any other suitable or desired communications protocol.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER' database, and MICROSOFT' Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL" database, and PERL®, Ruby, and/or PYTHON® programming languages.

In various embodiments, the server may include application servers (e.g. WEB SPHERE®, WEBLOGIC®, JBOSS®, POSTGRES PLUS ADVANCED SERVER', etc.). In various embodiments, the server may include web servers (e.g. Apache, HS, GOGGLE® Web Server, SUN JAVA® System Web Server, JAVA® Virtual Machine running on LINUX® or WINDOWS® operating systems). In various embodiments, service solutions may also include iaaS environments, PaaS environments, and/or the like.

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE®

CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. In various embodiments, any database may also include a no-SQL database, a key-value database, an in-memory database, a GPU database, and/or the like. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure. Association of certain data may be accomplished through any desired data association technique, such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, and/or sorting records in the file according to a known order to simplify lookup. The association step may be accomplished by a database merge function, for example, using a "key field" in pre-selected databases or data sectors. Various database tuning steps are contemplated to optimize database performance. For example, frequently used files such as indexes may be placed on separate file systems to reduce in/out ("I/O") bottlenecks.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

A system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, lookup tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia. COLD FUSION, COBOL, MICROSOFT® company's Active Server Pages, assembly, PERL® PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system can be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using a JAVASCRIPT® run-time environment configured to execute JAVASCRIPT® code outside of a web browser. For example, the software elements of the system may be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multithreaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC', optical storage devices, magnetic storage devices, and/or the like.

While the principles of this disclosure have been shown in various embodiments, many, modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 § 101.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method, comprising:
receiving, at a computing system, a series of independent variables that represent attributes of a specific commercial real estate property;
scaling and normalizing, by a processor of the computing system, the series of independent variables;
assembling the scaled and normalized series of independent variables in a database of the computing system;

applying weightings to the assembled scaled and normalized series of independent variables;
analyzing data relative to past results from industry data and from portfolio data from a user;
predicting a rental rate for the specific commercial real estate property;
transmitting, to a potential tenant for the specific commercial real estate property, an offer to lease at the rental rate;
storing the rental rate in the database,
organizing, by the computing system, the database into data tables;
creating, by the computing system, a linked series of data fields to form a data structure that contains the rental rate, the independent variables, the past results, the portfolio data, and the weightings;
tuning, by the computing system, the database to optimize database performance, wherein the tuning comprises reducing in and out bottlenecks by placing frequently used files on first and second separate file systems, wherein the first file system is operative on a first physical computing resource, and wherein the second file system is operative on a second physical computing resource different from the first physical computing resource; and
speeding searches by using a key field in associating, by the computing system, data for the rental rate and the independent variables within the data structure.

2. The method of claim 1, further comprising applying at least one of ordinary least squares, generalized linear models (GLM), logistic regression, random forests, decision trees, or multivariate adaptive regression splines in connecting with predicting the rental rate.

3. The method of claim 1, wherein the series of independent variables comprises at least one of market, trade area, location, type of center, asset, lease, landlord, comparable assets, negotiator, and strategy.

4. The method of claim 1, wherein the series of independent variables comprises at least one composite variable of multiple variables.

5. The method of claim 1, further comprising generating a composite score of the specific commercial real estate property, the composite score used as an independent variable in predicting the rental rate.

6. The method of claim 1, comprising repeating calculations for a series of specific commercial real estate properties to form a portfolio or a sub-portfolio.

7. The method of claim 1, further comprising predicting rental rates for the specific commercial real estate property for a plurality of lease periods.

8. The method of claim 1, further comprising accepting, by a landlord of the specific commercial real estate property, a rental contract for the specific commercial real estate property from the potential tenant.

9. The method of claim 1, further comprising simplifying lookup for the data fields by sorting, by the computing system, the data fields in the data structure according to a known order; and
obtaining, by the computer system, the rental rate and the independent variables by use of the frequently used files on first and second separate file systems.

* * * * *